(12) United States Patent
Minter

(10) Patent No.: US 7,974,475 B1
(45) Date of Patent: *Jul. 5, 2011

(54) ADAPTIVE BAYES IMAGE CORRELATION

(76) Inventor: Thomas Cecil Minter, Coldspring, TX (US)

( * ) Notice: Subject to any disclaimer, the term of this patent is extended or adjusted under 35 U.S.C. 154(b) by 189 days.

This patent is subject to a terminal disclaimer.

(21) Appl. No.: 12/583,395

(22) Filed: Aug. 20, 2009

(51) Int. Cl.
*G06K 9/62* (2006.01)

(52) U.S. Cl. .......... 382/209; 706/12; 382/159; 382/224

(58) Field of Classification Search ............... 382/209
See application file for complete search history.

(56) References Cited

U.S. PATENT DOCUMENTS

| | | | | |
|---|---|---|---|---|
| 3,484,746 | A * | 12/1969 | Fralick et al. ............. | 382/159 |
| 4,731,859 | A | 3/1988 | Holter | |
| 4,881,270 | A | 11/1989 | Knecht | |
| 5,027,413 | A | 6/1991 | Bernard | |
| 5,263,097 | A | 11/1993 | Katz | |
| 5,408,541 | A | 4/1995 | Sewell | |
| 5,412,738 | A * | 5/1995 | Brunelli et al. ............ | 382/115 |
| 5,440,647 | A * | 8/1995 | Floyd et al. .............. | 382/132 |
| 5,859,891 | A * | 1/1999 | Hibbard .................. | 378/62 |
| 5,867,118 | A | 2/1999 | McCoy | |
| 5,926,568 | A * | 7/1999 | Chaney et al. ............ | 382/217 |
| 6,044,171 | A | 3/2000 | Polyakov | |
| 6,084,989 | A * | 7/2000 | Eppler ................... | 382/293 |
| 6,115,052 | A * | 9/2000 | Freeman et al. .......... | 345/473 |
| 6,337,654 | B1 | 1/2002 | Richardson | |
| 6,377,206 | B1 | 4/2002 | Petty | |
| 6,437,728 | B1 | 8/2002 | Richardson | |
| 6,445,832 | B1 | 9/2002 | Lee | |
| 6,516,097 | B1 | 2/2003 | Pritt | |
| 6,621,914 | B1 | 9/2003 | Bornowski | |
| 6,665,440 | B1 * | 12/2003 | Zhang et al. ............. | 382/209 |
| 6,832,069 | B2 * | 12/2004 | Stout et al. .............. | 434/353 |
| 6,850,627 | B2 | 2/2005 | Phillips | |
| 6,857,112 | B1 * | 2/2005 | Teig et al. ............... | 716/115 |
| 6,883,148 | B1 * | 4/2005 | Teig et al. ............... | 716/115 |
| 6,895,103 | B2 * | 5/2005 | Chen et al. .............. | 382/117 |
| 6,901,152 | B2 | 5/2005 | Lee | |
| 6,909,997 | B2 | 6/2005 | Chen | |
| 6,910,025 | B2 * | 6/2005 | Cao ...................... | 706/15 |
| 6,940,999 | B2 | 9/2005 | Lin | |
| 6,944,566 | B2 | 9/2005 | Chen | |

(Continued)

OTHER PUBLICATIONS

Belcher, W. M. and Minter, T. C., "Selecting Class Weights to Minimize Classification Bias in Acreage Estimation" (1976). LARS Symposia. Paper 133. http://docs.lib.purdue.edu/lars_symp/133.*

(Continued)

*Primary Examiner* — Sath V Perungavoor

(57) ABSTRACT

This invention relates generally to a system and method for correlating two images for the purpose of identifying a target in an image where templates are provided a priori only for the target. Information on other objects in the image being searched may be unavailable or difficult to obtain. This invention treats the design of target matching-templates and target matched-filters for image correlation as a statistical pattern recognition problem. By minimizing a suitable criterion, a target matching-template or a target matched-filter is estimated which approximates the optimal Bayes discriminant function in a least-squares sense. Both Bayesian image correlation methods identify the target with minimum probability of error while requiring no prior knowledge of other objects in the image being searched. The system and method is adaptive in that it can be re-optimizing (adapted) to recognize the target in a new search image using only information from the new image.

15 Claims, 22 Drawing Sheets

U.S. PATENT DOCUMENTS

Figure 1:
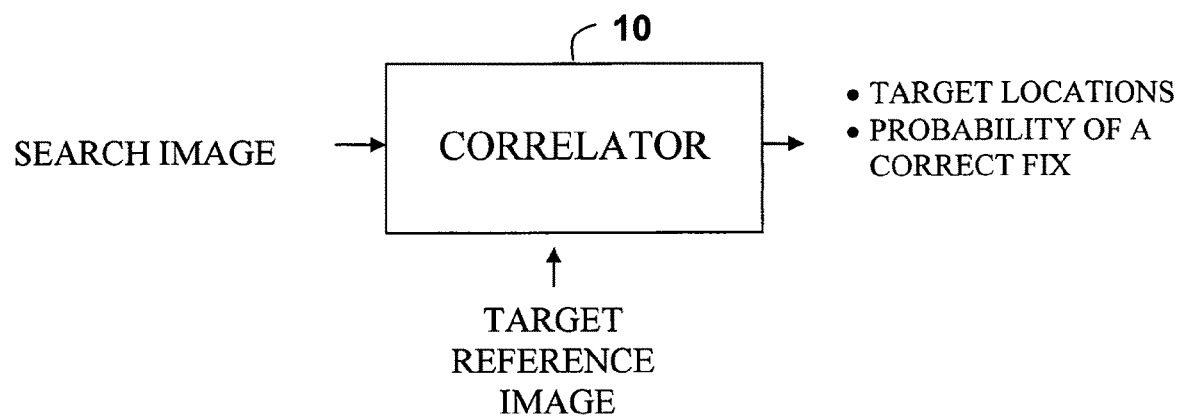

| | | | | |
|---|---|---|---|---|
| 6,954,551 | B2 | 10/2005 | Weismuller | |
| 7,031,499 | B2* | 4/2006 | Viola et al. | 382/118 |
| 7,085,426 | B2* | 8/2006 | August | 382/260 |
| 7,142,693 | B2* | 11/2006 | Zhang et al. | 382/100 |
| 7,177,447 | B2 | 2/2007 | Olson | |
| 7,184,994 | B2 | 2/2007 | Bella | |
| 7,254,266 | B2* | 8/2007 | Cotman et al. | 382/156 |
| 7,593,851 | B2* | 9/2009 | Yang | 704/228 |
| 7,639,841 | B2* | 12/2009 | Zhu et al. | 382/104 |
| 7,706,610 | B2* | 4/2010 | Zhang et al. | 382/173 |
| 2003/0016846 | A1* | 1/2003 | Chen et al. | 382/117 |
| 2003/0031367 | A1* | 2/2003 | Schwartz | 382/209 |
| 2003/0113021 | A1* | 6/2003 | Shiotani | 382/209 |
| 2003/0118246 | A1* | 6/2003 | August | 382/260 |
| 2005/0123893 | A1* | 6/2005 | Stout et al. | 434/353 |
| 2006/0204107 | A1 | 9/2006 | Dugan | |
| 2006/0269155 | A1 | 11/2006 | Tener | |
| 2008/0015793 | A1* | 1/2008 | Ben-Menahem et al. | 702/30 |
| 2008/0107330 | A1* | 5/2008 | Cotman et al. | 382/156 |
| 2009/0057395 | A1* | 3/2009 | He et al. | 235/379 |
| 2009/0252423 | A1* | 10/2009 | Zhu et al. | 382/209 |

OTHER PUBLICATIONS

Havens, K. A.; Minter, T. C.; and Thadani, S. G., "Estimation of the Probability of Error without Ground Truth and Known a Priori Probabilities" (1976). LARS Symposia. Paper 134. http://docs.lib.purdue.edu/lars_symp/134.*

Lin, G. C. and Minter, T. C., "Bayes Estimation on Parameters of the Single-Class Classifier" (1976). LARS Symposia. Paper 135. http://docs.lib.purdue.edu/lars_symp/135.*

Minter, T. C., "Single-Class Classification" (1975). LARS Symposia. Paper 54. http://docs.lib.purdue.edu/lars_symp/54.*

R. O. Duda and P. E. Hart, Pattern Classification and Scene Analysis, New York: John Wiley & Sons, 1973.

Ormsby, C. C.; "Advanced scene Matching Techniques," Proc. IEEE Nat'l Aerospace and Electronic Conf., Dayton, Ohio pp. 68-76, May 15-17, 1979.

Pratt, W. K,; Digital Image Processing, John Wiley, 1978.

Chen, Q, "Symmetric Phase-Only Matched Filtering of Fourier-Mellin Transforms for Image Registration and Recognition," IEEE Trans. PAMI, vol. 16, No. 12, Dec. 1994.

Pearson, J. J.: "Video-Rate Image Correlation Processor," SPIE, vol. 119, Application of Digital Image Processing, pp. 197-205, IOCC 1977.

Chen ,X.; Cham, T.: "Discriminative Distance Measures for Image Matching", Proceedings of the ICPR,Cambridge, England, vol. 3, 691-695, 2004.

Steding, T. L.; and Smith, F. W.: : "Optimum Filters for Image registration." IEEE Trans. AES , vol. ASE-15, No. 6, pp. 849-860, Nov. 1979.

Belsher, J. F.; Williams, H. F.; Kin, R. H.: "Scene Matching With Feature Detection," SPIE, vol. 186, Digital Process of Aerial Images, 1979.

Minter, T. C., "Minimum Bayes risk image correlation", SPIE, vol. 238, Image Processing for Missile Guidance, pp. 200-208, 1980.

Webber, R. F.; and Deloshmit, W. H.: "Product Correlation Performance for Gaussian Random Scenes," IEEE Trans. AES, vol. AES-10, No. 4, pp. 516-520, Jul. 1974.

* cited by examiner

US 7,974,475 B1

ADAPTIVE BAYES IMAGE CORRELATION

CROSS-REFERENCE TO RELATED APPLICATIONS

This application is related to application Ser. No. 12/004,329 filed on Dec. 20, 2007, entitled "Adaptive Bayes Pattern Recognition", application Ser. No. 12/011,518 filed on Jan. 28, 2008, entitled "Adaptive Bayes Feature Extraction", and application Ser. No. 12/074,901 filed Mar. 6, 2008, entitled "A Priori Probability and Probability of Error Estimation for Adaptive Bayes Pattern recognition".

FEDERALLY SPONSORED RESEARCH

Not Applicable

BACKGROUND OF THE INVENTION

1. Field of Invention

This invention relates generally to a system and method for correlating two images for the purpose of identifying a target in an image where templates are provided a priori only for the target. Information on the other objects in the image being searched may be unavailable or difficult to obtain. This invention treats the problem of designing target matching-templates and target matched-filters for image correlation as a statistical pattern recognition problem. By minimizing a suitable criterion, a target matching-template or a target matched-filter is estimated which approximates the optimal Bayes discriminant function in a least-squares sense. When applied to an image, both Bayesian image correlation methods are capable of identifying the target in a search image with minimum probability of error while requiring no a priori knowledge of other objects that may exist in the image being searched. The system and method is adaptive in the sense that it can be readily re-optimizing (adapting) to provide optimal discrimination between the target and any unknown objects which may exist in a new search image, using only information from the new image being searched.

2. Prior Art—FIGS. 1, 2, 3, 4, and 5

Image correlation is the process of comparing a sensor image and a reference image in order to identify the presences and location of the reference image in the sensor image. Accurate identification of the presences of a reference image in another image and accurate and unambiguous measurement of its location is important in many practical applications.

Image correlation is used in a number of military applications, such as guiding a missile to a pre-selected target. It is also used in medical image registration, robotics, automated manufacturing, GIS, Home Land Security/Law Enforcement (fingerprint recognition, face recognition, iris recognition), and content-based image retrieval. Registration of multispectral images, acquired from earth-observing satellites, is another important application.

The basic elements of image correlation are shown in FIG. 1. Referencing FIG. 1, it can be seen that the inputs to the Correlator 10 are the Search Image and a Target Reference Image. The outputs from the Correlator 10 are the Target Locations in the Search Image and an estimate of the Probability of a Correct Fix.

A number of techniques for image correlation have been reported in the literature, the simplest technique being various forms of the spatial template-matching algorithm [R. O. Duda and P. E. Hart, *Pattern Classification and Scene Analysis*, New York: John Wiley & Sons, 1973, pp.278], [Ormsby, C.; "Advanced scene Matching Techniques," Proc. IEEE Nat'l Aerospace and Electronic Conf., Dayton, Ohio pp. 68-76, May 15-17, 1979], and [Pratt, W. K,; *Digital Image Processing*, John Wiley, 1978, pp. 552].

The analog of the spatial template-matching algorithm in the spatial frequency domain is the matched-filter algorithm [R. O. Duda and P. E. Hart, *Pattern Classification and Scene Analysis*, New York: John Wiley & Sons, 1973, p.307] and [Pratt, W. K,; *Digital Image Processing*, John Wiley, 1978, pp. 553-560]. Frequency domain matched-filter has the desirable characteristic in that it can be implemented using the fast Fourier transform (FFT) algorithm.

A number of more sophisticated correlation techniques based on matched-filtering have been developed in recent years. These include the phase correlation method [Chen, Q.; Defrise, M.; and Deconinck, F.: "Symmetric Phase-Only Matched Filtering of Fourier-Mellin Transforms for Image Registration and Recognition," *IEEE Trans. on Pattern Analysis and Machine Intelligence*, vol. 16, no. 12, Dec. 1994], [Pearson, J. J.; Hines, D. c., Jr.; Golosman, S.; and Kuglin, C. D.: "Video-Rate Image Correlation Processor," SPIE, vol. 119, Application of Digital Image Processing, pp. 197-205, IOCC 1977], modeling images using feature vectors [Chen, X.; Cham, T.: "Discriminative Distance Measures for Image Matching", Proceedings of the International Conference on Pattern Recognition (ICPR), Cambridge, England, vol. 3, 691-695, 2004], and optimum filters [Steding, T. L.; and Smith, F. W.: "Optimum Filters for Image registration." *IEEE Trans. on Aerospace and Electronic Systems*, vol. ASE-15, no. 6, pp. 849-860, November 1979].

Belsher, Williams, and Kin [Belsher, J. F.; Williams, H. F.; Kin, R. H.: "Scene Matching With Feature Detection," SPIE, vol. 186, Digital Process of Aerial Images, 1979] were able to treat template-matching as a classical pattern recognition problem by assuming independence between adjacent picture elements (pixels) in the image and by assuming the form of the probability density function to be Gaussian, Laplacian, or Cauchy. Minter [Minter, T. C., "Minimum Bayes risk image correlation", SPIE, vol. 238, Image Processing for Missile Guidance, pp. 200-208, 1980] was also able to treat matched-filtering as a classical pattern recognition problem by assuming independence between adjacent picture elements (pixels) in the image but without assuming a form for the probability density function. However, the assumption of independence between pixels elements in the image reduces the effectiveness of these image correlation approaches since pixel element correlation is a potentially important source of information in target recognition.

The performance of image correlation techniques is usually characterized in terms of the probability of a false fix on the target (or alternatively, the probability of a correct fix on the target) and registration accuracy. The probability of a correct fix on the target refers to the probability that the correlation peak truly identifies a target in the search image. A related quantity is the peak-to-side-lobe ratio (PSR), which is defined as the value of the match-point correlation peak divided by the root mean square (RMS) value of the correlation function at points excluding this peak. Once the correct peak has been identified, the accuracy with which the true position of the peak is located can be quantified by the variance of the correlation peak location. Webber and Deloshmit [Webber, R. F.; and Deloshmit, W. H.: "Product Correlation Performance for Gaussian Random Scenes," *IEEE Trans. on Aerospace and Electronics Systems*, vol. AES-10, no. 4, pp. 516-520, July 1974] have shown that the probability of a false fix is a monotonically decreasing function of the PSR.

This invention treats the problem of designing target matching-templates and target matched-filters for image correlation as a statistical pattern recognition problem. It is shown that by minimizing a suitable criterion, a target matching-template or a target matched-filter can be estimated which approximates the optimum Bayes discriminant function in a least-squares sense. It is well known that the use of the Bayes discriminant function in target classification minimizes the probability of a false fix [R. O. Duda and P. E. Hart, *Pattern Classification and Scene Analysis*, New York: John Wiley & Sons, 1973, pp.11].

However, the use of pattern recognition techniques in image correlation application presents several unique problems. The target's characteristics are usually well known and an appropriate reference image (or images) is available which provides an appropriate statistical representation of the target. However, often little prior information is available on the statistical characteristics of the other objects (or classes) present in the image which might be confused with the target. This lack of information about the confusion objects (or classes) presents a serious problem in designing an optimal discriminant procedure for recognizing the target.

Most of the literature on Bayes discriminant procedures is restricted to the two-class problem where class-conditional probability distributions functions are either available for each class (or object) or can be estimated from labeled training samples available for each class. Below, the Bayes decision rule is reformulated to make it suitable for use in the unique environment associated with target discriminant. The reformulated decision rule only requires an estimate of the target's posterior probability function. It will be shown that the target's posterior probability function can be estimated using labeled training samples from the target and unlabeled samples from the image being searched. Its application to Bayes image correlation will be discussed.

It will also be shown that the proposed image correlator is adaptive in the sense that it is capable of adapting both the target matching-template and the target matched-filter to provide optimal discrimination between the target and any unknown objects which may exist in the image being searched. If a new search image, with a possibly different set of unknown objects is to be searched, the target matching-template and the target matched-filter can be readily re-optimized (adapted), for the new set of unknown objects before searching the new image. Adaptation is accomplished using only unlabeled patterns from the new image being searched.

Creating Vector Representations of Target Templates and the Search Image

In target discrimination, it is assumed that two classes of objects are in the search image—target and not-target objects. Let $C_t$ be the class (or object) label for target and $C_{nt}$ be the class (or object) label for not-target. The problem of classification arises when an event described by a set of measurements is to be associated with these two classes. The event cannot be identified directly with a class, so a decision must be made on the basis of the set of observed measurements as to which class the event belongs (i.e., target or not-target). The set of measurements can be represented as a vector in the measurement space. This measurement will be called the measurement vector, or simply a sample, and will be denoted as $X=(x_1,x_2,\ldots,x_d)^T$, where the T denotes the transpose and d is the number of measurements or the dimensionality of the measurement space.

In the context of target identification in images:
Let
$S(y,z)$—be the image to be searched
$T_j(y,z)$—be a target template
D—be the domain of definition of the target template
(D, for example, might be 20×20 pixels square, whereas the search image might be 500×500 pixels square.)

Figure 2:
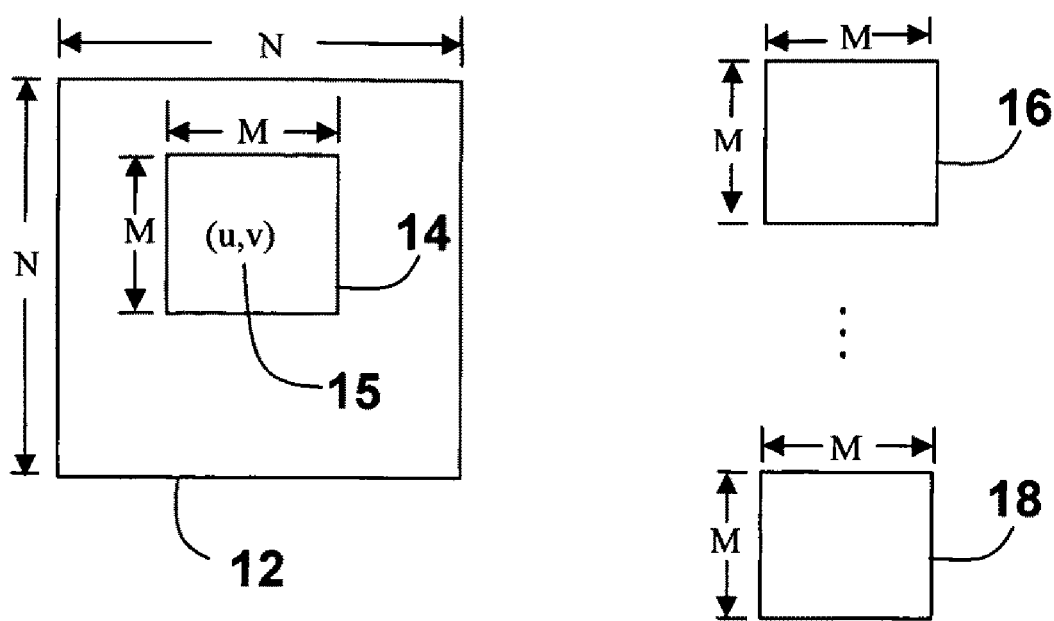

Labeled measurement vectors for the target can be formed in the following manner: As shown in FIG. 2, target reference images $T_1(y,z)$ 16 thru $T_{K_t}(y,z)$ 18, contain examples of the target, which are M×M pixels in size. It is assumed, for the sake of generality, that $K_t$ reference images, $T_j(y,z)$, $j=1, 2, \ldots, K_t$, are available, each containing an example of the target. A target measurement vector $X_t(j)$ is constructed from $T_j(y,z)$ by stacking the M columns of $T_j(y,z)$. The first M elements of the target measurement vector $X_t(j)$ are the elements of the first column of $T_j(y,z)$, the next M elements of $X_t(j)$ are from the second column of $T_j(y,z)$, and so forth, for all M columns of $T_j(y,z)$. The dimension, d, of $X_t(j)$ is $d=M^2$. This procedure produces $K_t$ measurement vectors, $X_t(j)$, $j=1, 2, \ldots, K_t$, one for each target template.

Unlabeled measurement vectors from the search image $S(y,z)$ can be formed in a similar manner. Again, referencing FIG. 2, the image to be searched, $S(y,z)$ 12, is considered for simplicity, to be N×N in size where N>M. We select a M×M dimension sub-area $S(y-u,z-v)$ 14 which is equal to the target template in size. As shown in FIG. 2, the center of sub-area $S(y-u,z-v)$ is located at $(u,v)$ 15. An unlabeled measurement vector, $X(i)$, is constructed from the M×M sub-area $S(y-u,z-v)$ 14 by stacking the columns of the M×M sub-area. The dimensional, d, of the unlabeled measurement vector, $X(i)$, is $d=M^2$. The search image is systematically scanned by incrementing u and v. The index i for $X(i)$ is indexed to u and v. From the search image, K unlabeled measurement vectors, $X(i)$, $i=1, 2, \ldots, K$ are constructed where $K=(N-M+1)^2$.

The Adaptive Bayes Approach to Pattern Recognition

Bayes decision theory is a fundamental approach to the problem of pattern recognition [R. O. Duda and P. E. Hart, *Pattern Classification and Scene Analysis*, New York: John Wiley & Sons, 1973, pp. 11-17]. The approach is based on the assumption that the decision problem can be poised in probabilistic terms where all of the relevant probability values are known. Specifically, the application of a standard Bayes classifier requires estimation of the posterior probabilities of each class. If information about the probability distributions of classes is available, the posterior probability can be calculated for each measurement and each measurement can be attributed to the class with the highest posterior probability.

However, this traditional approach is not feasible when unknown "not-target" classes are present in the search image. Traditional approaches require that the number of "not-target" classes be known in advance and a training set (or class distributions) be available for all classes in the image to be classified to ensure optimal classifier performance. A modification to the standard Bayes decision rule is presented below to address this problem.

The decision making process for Bayes pattern recognition can be summarized as follows: Given a set of K measurement vectors, $X(i)$, $i=1, 2, \ldots, K$, it is desired to associate the measurements with either the "target" or the "not-target" class with minimum probability of error where X is a d-dimensional vector in the measurement space or $X=(x_1, x_2, \ldots, x_d)^T$.

For the moment, let us assume that complete information, in the form of labeled training samples, is available for the "target" and the "not-target" classes. Using training samples from these two classes, we can estimate conditional probability density functions for the two classes where $P(X/C_t)$ is the conditional probability density function (pdf) for the "target", and $P(X/C_{nt})$ is the pdf for the "not-target" class. We will assume that the associated prior probabilities for the two classes, $P_{C_t}$ and $P_{C_{nt}}$, are known. Using these probability estimates, the standard maximum likelihood decision rule for two class pattern recognition is:

$$\text{If: } P_{C_t}P(X/C_t) \geq P_{C_{nt}}P(X/C_{nt}), \quad (1)$$

Figure 3:
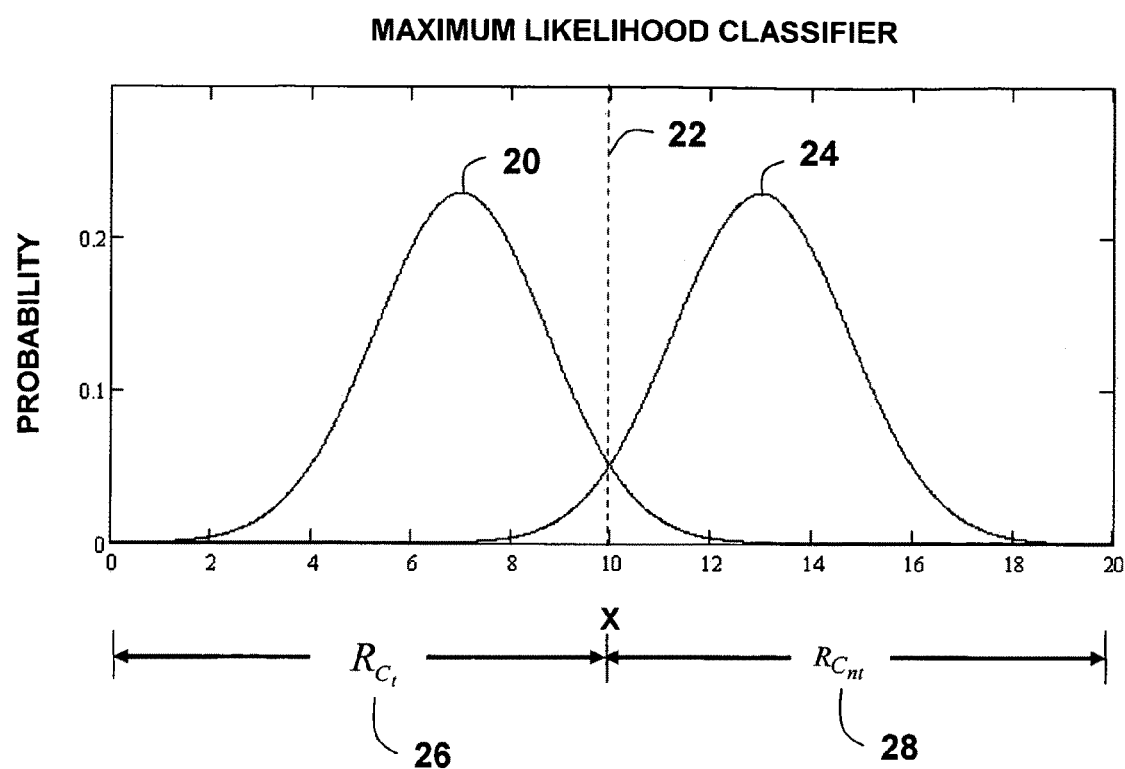

Classify X as target
Otherwise, Classify X as not-target
where
    $P(X/C_t)$=Conditional probability density function of the "target" class
    $P(X/C_{nt})$=Conditional probability density function of the "not-target" class
    $P_{C_t}$=prior probability of the "target"
    $P_{C_{nt}}$=prior probability of the "not-target" class The maximum likelihood classifier is illustrated in FIG. 3 where normality is assumed for the target and not-target class-conditional probability density functions $P(X/C_t)$ 20 and $P(X/C_{nt})$ 24. The decision boundary 22, where $P_{C_t}P(X/C_t)=P_{C_{nt}}P(X/C_{nt})$, is also shown.

The univariate Gaussian density functions, 20 and 24, in FIG. 3 are defined as $$P(X/C_i) = \frac{1}{2\pi^{1/2}\sigma_i} e^{1/2\left(\frac{x-\mu_i}{\sigma_i}\right)^2} \quad (2)$$

The parameters of the density functions in FIG. 3 are $\mu_{C_t}=7$, $\mu_{C_{nt}}=13$, $\sigma_{C_t}=3$, and $\sigma_{C_{nt}}=3$. The prior probabilities are $P_{C_t}=0.5$ and $P_{C_{nt}}=0.5$.

Again referencing FIG. 3 it can be seen that
    $R_{C_t}$=region where samples are classified as "target" 26: i.e., where $P(X/C_t) \geq P(X/C_{nt})$
    $R_{C_{nt}}$=region where samples are classified as "not-target" 28: i.e., where $P(X/C_t) < P(X/C_{nt})$ An equivalent decision rule, to that in eq. (1), can be obtained by dividing both sides of eq. (1) by the unconditional probability of X, which is $P(X)$, or $$\text{If: } \frac{P_{C_t}(X/C_t)}{P(X)} \geq \frac{P_{C_{nt}}P(X/C_{nt})}{P(X)}; \quad (3)$$

Classify X as target
Otherwise, Classify X as not-target
where $$P(X) = P_{C_t}P(X/C_t) + P_{C_{nt}}P(X/C_{nt}) \quad (4)$$

Figure 4:
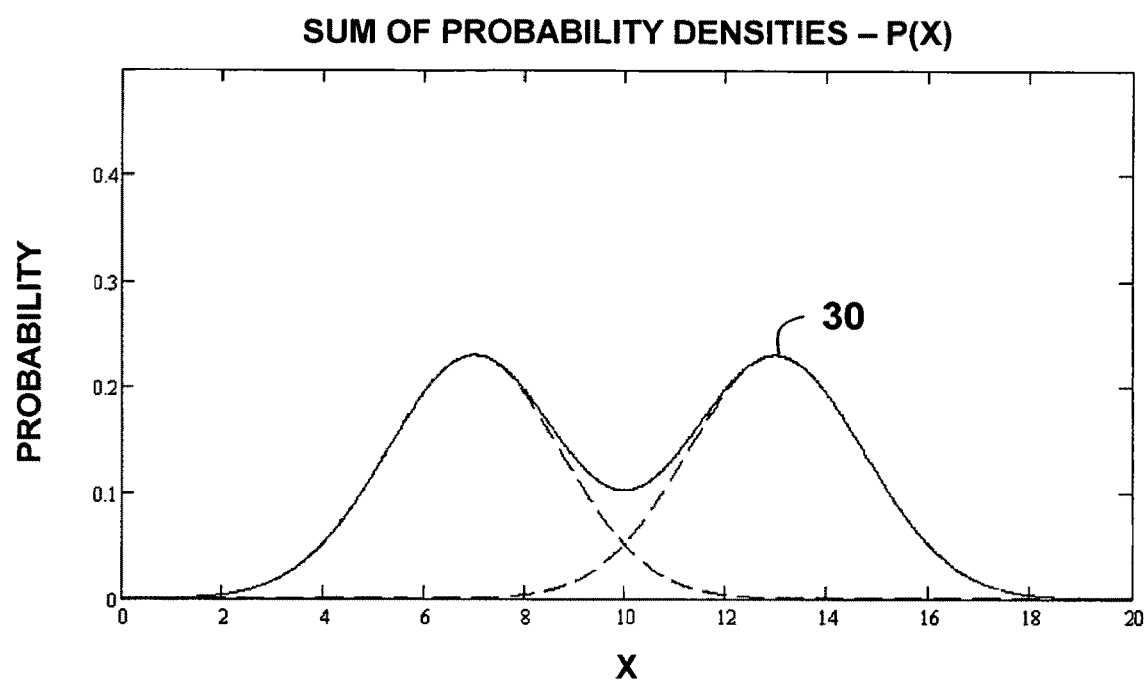

A graph of $P(X)$ 30, eq. (4) is shown in FIG. 4.
The Bayes decision rule can be defined in terms of posterior probabilities as:

$$\text{If: } P(C_t/X) \geq P(C_{nt}/X); \quad (5)$$

Classify X as target,
Otherwise, classify X as not-target
where $P(C_t/X)$ and $P(C_{nt}/X)$ are the conditional posterior probability functions for the "target" and the "not-target" classes respectively. These posterior probability functions are defined as:

$$P(C_t/X) = \frac{P_{C_t}P(X/C_t)}{P(X)} \quad (6)$$

$$P(C_{nt}/X) = \frac{P_{C_{nt}}P(X/C_{nt})}{P(X)} \quad (7)$$

Minter [T. C. Minter, "A Discriminant Procedure for Target Recognition in Imagery Data", Proceedings of the IEEE 1980 National Aerospace and Electronic Conference—NAECON 1980, May 20-22, 1980] proposed an alternative Bayes decision rule that can be derived by noting that the two posterior probability functions sum to 1, namely $$P(C_t/X) + P(C_{nt}/X) = 1 \quad (8)$$

Rearranging eq. (8) we get $$P(C_{nt}/X) = 1 - P(C_t/X)$$

(9)

Substituting eq. (9) into (5) and simplifying, we obtain an alternative Bayes decision rule which only involves the target posterior distribution function, namely $$\text{If: } P(C_t/X) \geq \tfrac{1}{2}, \quad (10)$$

Classify X as the target
Otherwise, Classify X as not-target
where $$P(C_t/X) = \frac{P_{C_t}P(X/C_t)}{P(X)} \quad (11)$$

Equation (10) is referred to as the adaptive Bayes decision rule. The prior probability, $P_{C_t}$, of the target, in eq. (10), is assumed to be known.

Figure 5:
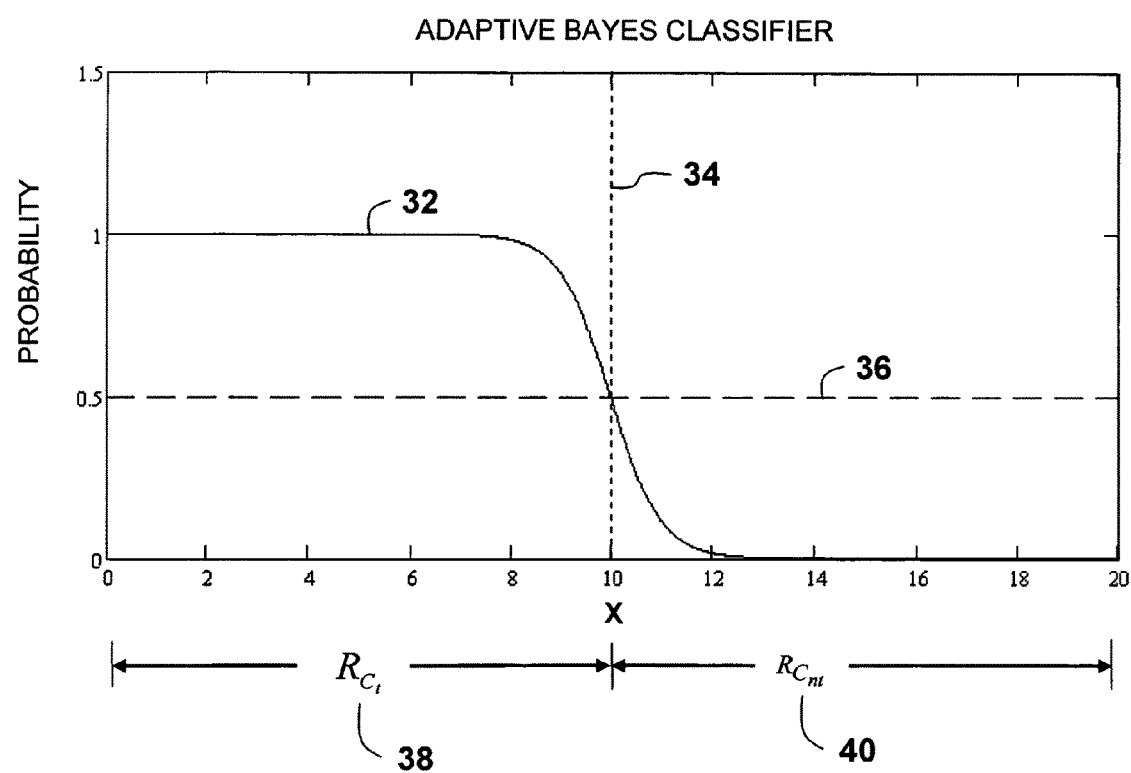

FIG. 5, shows a graph of the target posterior distribution function, $P(X/C_t)$ 32. Also shown in FIG. 5 are the decision boundary 34 (where $P(C_t/X)=\tfrac{1}{2}$) and the decision threshold 36, located at the point where $P(C_t/X)=0.5$. Again referencing FIG. 5 it can be seen that
    $R_{C_t}$=region where samples are classified as "target" 38: i.e., where $P(C_t/X) \geq \tfrac{1}{2}$
    $R_{C_{nt}}$=region where samples are classified as "not-target" 40: i.e., $P(C_t/X) < \tfrac{1}{2}$ Again referencing FIG. 5, a useful observation is that the function $P(C_t/X)$ 32 is a transformation from the d-dimensional measurement space to the one-dimensional line. The function $P(X/C_t)$ 32 maps the target samples as close as possible to "1" in region $R_{C_t}$ 38 and it maps the not-target samples as close as possible to "0" in region $R_{C_{nt}}$ 40.

The Adaptive Bayes decision rule, eq. (10), is adaptive for the following reason. It is capable of adapting the decision boundary to provide optimal discrimination between the "target" class and any unknown "not-target" class that may exist in the data set to be classified. In particular, the target class-conditional probability density function, $P(X/C_t)$, in the numerator of eq. (11), can be estimated using labeled sample from the "target" class. For example, if $P(X/C_t)$ is normally distributed, its mean and variance can be estimated from training samples. The unconditional probability density function, $P(X)$, in the denominator of eq. (11), is not conditioned of a class and can be estimated using unlabeled samples from the data set to be classified. A number of nonparametric density function estimation techniques are available for estimating P(X). For example P(X) can be estimated using $K^{th}$ Nearest Neighbor [R. O. Duda and P. E. Hart, *Pattern Classification and Scene Analysis*, New York: John Wiley & Sons, 1973, pp. 87]. Using estimates for $P(X/C_t)$ and $P(X)$, the target posterior probability function, $P(C_t/X)$, eq. (11), can estimated and used to classifying data using the adaptive Bayes decision rule, eq. (10). If a new data set is to be classified, $P(X)$, can be re-estimated using unlabeled data from this new data set and a new target posterior probability function, $P(C_t/X)$, derived. This new estimator for the posterior probability function $P(C_t/X)$, re-optimizes (adapts) the decision boundary to accommodate any changes in the distribution of the "not-target" class in the new data set.

Gorte [B. Gorte and N. Gorte-Kroupnova, "Non-parametric classification algorithm with an unknown class", *Proceedings of the International Symposium on Computer Vision*, 1995, pp. 443-448], Mantero [P. Mantero, "Partially supervised classification of remote sensing images using SVM-based probability density estimation", IEEE Transactions on Geoscience and Remote Sensing, vol. 43, no. 3, March 2005, pp. 559-570], and Guerrero-Curieses [A. Guerrero-Curieses, A Biasiotto, S. B. Serpico, and. G. Moser, "Supervised Classification of Remote Sensing Images with Unknown Classes," Proceedings of IGARSS-2002 Conference, Toronto, Canada, June 2002] investigated using $K^{th}$ Nearest Neighbor probability estimation techniques to estimate $P(C_t/X)$, eq. (11), and classify data using the adaptive Bayes decision rule, eq. (10). They demonstrated that it can be used successfully in crop identification using remotely sensed multi-spectral satellite imagery.

Minter [T. C. Minter, "A Discriminant Procedure for Target Recognition in Imagery Data", Proceedings of the IEEE 1980 National Aerospace and Electronic Conference—NAECON 1980, May 20-22, 1980] proposed an alternative least squares criterion for approximating the target posterior probability, $P(C_t/X)$. This least squares algorithm uses labeled samples from the target-class and unlabeled samples from the image to be classified, to approximate the target posterior probability function, $P(C_t/X)$, with a function. This least squares criterion is described below.

Least Squares Estimation of the Adaptive Bayes Decision Function

The target posterior probability function, $P(C_t/X)$, eq.(11), can be approximated by minimizing the mean square difference between the estimated target posterior probability function, $\hat{P}(C_t/X)$, and the true target posterior probability function, $P(C_t/X)$. The least squares criterion is:

$$J = \int (\hat{P}(C_t/X) - P(C_t/X))^2 P(X) dX + C \quad (12)$$

where $$P(C_t/X) = \frac{P_{C_t} P(X/C_t)}{P(X)} \quad (13)$$

and, C, in eq. (12), is an arbitrary constant.

The least squares criteria, eq. (12), cannot be minimized directly since the true target posterior probability function, $P(C_t/X)$, is unknown.

The least square criterion, eq. (12), is reformulated below to provide an equivalent criterion, with no unknowns, which can be minimized to estimate the parameters of a function which approximates the true target posterior probability function, $P(C_t/X)$, in a least-squares sense.

First, expanding the least squares criteria, eq. (12), we get $$J = \int (\hat{P}(C_t/X)^2 - 2\hat{P}(C_t/X)P(C_t/X) + P(C_t/X)^2) P(X) dX + C \quad (15)$$

Rearranging we get:

$$J = \int (\hat{P}(C_t/X)^2 P(X) dX - \int 2\hat{P}(C_t/X)P(C_t/X)P(X)dX + \int P(C_t/X)^2 P(X)dX + C \quad (16)$$

Substituting in the definition of $P(C_t/X)$, from eq. (11), into the second term of eq. (16), we get:

$$J = \int \left( \hat{P}(C_t/X)^2 P(X) dX - \int 2\hat{P}(C_t/X) \frac{P_{C_t} P(X/C_t)}{P(X)} P(X) dX + \int P(C_t/X)^2 P(X) dX + C \right) \quad (17)$$

Noting that $P(X)$ can be canceled out in the second term of eq. (17), we get $$J = \int (\hat{P}(C_t/X)^2 P(X) dX - \int 2\hat{P}(C_t/X) P_{C_t} P(X/C_t) dX + \int P(C_t/X)^2 P(X) dX + C \quad (18)$$

Let us choose C in eq. (18) as:

$$C = 2P_{C_t} \quad (19)$$

or, multiplying eq. (19) by 1, we get $$C = 2P_{C_t} \cdot 1 \quad (19)$$

and noting that $$\int P(X/C_t) dX = 1 \quad (20)$$

We can substitute eq. (20) into eq. (19) and rewrite eq. (19) as $$C = 2P_{C_t} \int P(X/C_t) dX \quad (21)$$

Substituting this definition of C into eq. (18) we get:

$$J = \int (\hat{P}(C_t/X)^2 P(X) dX - 2P_{C_t} \int \hat{P}(C_t/X) P(X/C_t) dX + 2P_{C_t} \int P(X/C_t) dX + \int P(C_t/X)^2 P(X) dX \quad (22)$$

Combining terms and rearranging we get:

$$J = \int (\hat{P}(C_t/X)^2 P(X) dX - 2P_{C_t} \int (\hat{P}(C_t/X) - 1) P(X/C_t) dX + \int P(C_t/X)^2 P(X) dX \quad (23)$$

Since the third term in eq. (23) is not a function of the estimated target posterior distribution, $\hat{P}(C_t/X)$, it can be considered a constant. Let us define a new constant C'

$$C' = \int P(C_t/X)^2 P(X) dX \quad (24)$$

Substituting C' into eq. (23) we get $$J = \int (\hat{P}(C_t/X)^2 P(X) dX - 2P_{C_t} \int [\hat{P}(C_t/X) - 1] P(X/C_t) dX + C' \quad (25)$$

The expected value of a function (∘) with respect to the labeled samples from the target class is defined as:

$$E_{C_t}(\circ) = \int (\circ) P(X/C_t) dX \quad (26)$$

The expected value with respect to the unlabeled samples from $P(X)$ (the data to be classified) is defined as:

$$E(\circ) = \int (\circ) P(X) dX \quad (27)$$

Using these definitions, the least square criteria, eq. (25), can be rewritten as:

$$J = E[\hat{P}(C_t/X)^2] + 2P_{C_t} E_{C_t}[\hat{P}(C_t/X) - 1] + C' \quad (28)$$

We will approximate the posterior probability of the class-of-interest $\hat{P}(C_t/X)$ using a linear combination of "scalar functions of the measurements", or $$\hat{P}(C_t/X) \approx A^T F(X) \quad (29)$$

where $F(X)$ is a vector containing "scalar functions of the measurements", or $$F(X) = (f(X)_1, f(X)_2, \ldots f(X)_d)^T \quad (30)$$

and the vector A is a vector of weights for the scalar functions, f(X), or $$A = (a_1, a_2, \ldots a_d)^T \quad (31)$$

Since the parameter weighting vector, $A=(a_1,a_2,\ldots a_d)^T$, is used to approximate the target posterior distribution function $\hat{P}(C_t/X)$, we will often refer to $A=(a_1,a_2,\ldots a_d)^T$ as the Bayes parameter weighting vector.

Now, substituting $A^T F(X)$, from eq. (28), for $\hat{P}(C_t/X)$ in eq. (28) we get:

$$J = E[(A^T F(X))^2] + 2P_{C_t} E_{C_t}[A^T F(X) - 1] + C \quad (32)$$

For a finite set of K unlabeled training samples, X(i), i=1, 2, ..., K, from the search image and $K_t$ labeled samples, $X_t(j)$, j=1, 2, ..., $K_t$, from the target, we can rewrite eq. (32), as $$J = \frac{1}{K} \sum_{i=1}^{K} \left[ (A^T F(X(i)))^2 \right] + 2P_{C_t} \frac{1}{K} \sum_{j=1}^{K_t} [A^T F(X(j)) - 1] + C' \quad (33)$$

This formulation of the least square error criteria, eq. (33), is equivalent to the original least squares criterion, eq. (12), however eq. (33) is a preferable form since it contains no unknowns and differs only by a constant from eq. (12). In addition, it is shown below that eq. (33) can be minimized to obtain an estimator of the Bayes parameter weighting vector, $A=(a_1, a_2, \ldots a_d)^T$.

However, the most important attribute of the least-squares criterion, eq. (33), is that it can be evaluated using only unlabeled samples from the search image and labeled samples from the target.

Another useful observation is that the function $A^T F(X)$ is a transformation from the d-dimensional measurement space to the one-dimensional real line. The least-square criterion in eq. (33) is minimized if $A^T F(X)$ maps the target samples as close to one as possible and the unlabeled samples, as close to zero as possible.

Estimating the Bayes Parameter Weighting Vector

In this section, an estimator for the Bayes parameter weighting vector $A=(a_1, a_2, \ldots a_d)^T$, is obtained by minimization of the least-square criterion, eq. (32).

Differentiating J, in eq. (32), with-respect-to the Bayes parameter weighting vector, A, and setting to zero we get:

$$\frac{\delta J}{\delta A} = 2E[(F(X)F(X)^T A)] + 2P_{C_t} E_{C_t}[F(X)] = 0 \quad (34)$$

Rearranging eq. (34) yields $$E[(F(X)F(X)^T)]A = P_{C_t} E_{C_t}[F(X)] \quad (35)$$

and solving for A we get $$A = P_{C_t} E[(F(X)F(X)^T)]^{-1} \cdot E_{C_t}[F(X)] \quad (36)$$

Given a set of K unlabeled samples X(i), i=1, 2, ..., K from the search image and $K_t$ labeled samples $X_t(i)$, i=1, 2, ..., $K_t$ from the target, the Bayes parameter weighting vector $A=(a_1, a_2, \ldots a_d)^T$ may be estimated as follows:

$$A = P_{C_t} \left\{ \frac{1}{K} \sum_{i=1}^{K} [(F(X(i))F(X(i))^T)] \right\}^{-1} \cdot \frac{1}{K_t} \sum_{j=1}^{K_t} [F(X_t(j))] \quad (37)$$

Approximating the Target Posterior Probability Function

Below, a method is presented for approximating the target posterior probability function, $\hat{P}(C_t/X)$ using a linear combination of scalar functions of the measurements.

For template-matching and matched-filtering, a particularly useful form for the "scalar functions of the measurements" F(X) in eq. (30), is simply the measurement vector $X=(x_1,x_2,\ldots,x_d)^T$ or $$F(X) = (x_1, x_2, \ldots, x_d)^T \quad (38)$$

Since $$\hat{P}(C_t/X) = A^T F(X) \quad (39)$$

the target posterior probability, $\hat{P}(C_t/X)$, can be approximated using a linear combination of weighted scalar functions of the measurements of the form $$\hat{P}(C_t/X) \approx a_1 x_1 + a_2 x_2 + \ldots + a_d x_d \quad (40)$$

where $$A = (a_1, a_2, \ldots a_d)^T \quad (41)$$

and $$F(X) = (x_1, x_2, \ldots, x_d)^T \quad (42)$$

and since $X=(x_1, x_2, \ldots, x_d)^T$, then $$F(X) = X \quad (43)$$

Substituting this definition of F(X) into eq. (37) we obtain the following estimator for the Bayes parameter weighting vector $A=(a_1, a_2, \ldots a_d)^T$, or $$A = P_{C_t} \left\{ \frac{1}{K} \sum_{i=1}^{K} [X(i)X(i)^T] \right\}^{-1} \cdot \frac{1}{K_t} \sum_{j=1}^{K_t} [X_t(j)] \quad (44)$$

Substituting eq. (43) into eq. (39) we get $$\hat{P}(C_t/X) \approx A^T X \quad (45)$$

The Adaptive Bayes decision rule for classifying the measurement vector X becomes If: $A^T X \geq \frac{1}{2}$; (46)

Classify X as target,
Otherwise, classify X as not-target

Interpreting the Adaptive Bayes Parameter Weighting Vector Estimator

It is important to note that the second term of the estimator for the Bayes parameter weighting vector, $A=(a_1, a_2, \ldots a_d)^T$, eq. (37), is simply the mean, $\mu_t$, of the target measurement vectors, i.e.

$$\mu_t = \frac{1}{K_t} \sum_{j=1}^{K_t} X_t(j) \quad (47)$$

Therefore we can re-write eq. (37) as $$A = P_{C_t} \left\{ \frac{1}{K} \sum_{i=1}^{K} [X(i)X(i)^T] \right\}^{-1} \cdot \mu_t \quad (48)$$

Equation (47) implies that the target mean, $\mu_t$, can be estimated from a single target template. In many target recognition application, often only a single target template is available for using in training the classifier. If that single target template is truly representative of the mean of the target, a valid approximation of the target posterior probability function $\hat{P}(C_t/X)$ can be obtained using the Bayes parameter weighting vector, $A=(a_1, a_2, \ldots a_d)^T$, and target posterior probability function $\hat{P}(C_t/X)$, estimated using eq. (45). This, in turn, implies we can obtain optimal discrimination between the target and not-target objects in the search image using a single target template. Other statistical decision rules, such as the Gaussian maximum likelihood decision rule and the Fisher's linear discriminant, require sufficient numbers of target templates to estimate both the mean and covariance matrix of the target—a significant limitation in target recognition applications.

Again referring to eq. (48), it is also important to note that the M×M matrix, $$\left\{\frac{1}{K}\sum_{i=1}^{k}[X(i)X(i)^T]\right\}^{-1},$$

is formed using unlabeled samples from the image being searched. If a new image is to be searched, a new set of set of unlabeled samples can be obtained from the new search image and used to obtain a new estimate of the M×M matrix, $$\left\{\frac{1}{K}\sum_{i=1}^{K}[X(i)X(i)^T]\right\}^{-1}.$$

An updated estimate of the Bayes parameter weighting vector $A=(a_1, a_2, \ldots a_d)^T$ can then be obtained using eq. (48) and a new approximation of the target posterior probability function $\hat{P}(C_t/X)$ obtained using eq. (45). Using this updated estimate of $\hat{P}(C_t/X)$, we can obtain optimal discrimination between the target and not-target objects in the new search image. Thus the decision boundary is re-optimized (adapted) for discriminating between the target and unknown objects in the new search image using only unlabeled samples from the new search image.

SUMMARY

This invention relates generally to a system and method for correlating two images for the purpose of identifying a target in an image where templates are provided a priori only for the target. Information on the other objects in the image being searched may be unavailable or difficult to obtain. The system and method treats the problem of designing target matching-templates and target matched-filters for image correlation as a statistical pattern recognition problem. By minimizing a suitable criterion, a target matching-template or a target matched-filter is estimated which approximates the optimal Bayes discriminant function in a least-squares sense. These target matching-templates and target matched-filters, when applied to a search image, identifies the target in the search image with minimum probability of error while requiring no a priori knowledge of other unknown objects that may exist in the image being searched.

Optimal Bayes target matching-templates and target matched-filters are estimated using a set of labeled patterns derived from target templates and unlabeled patterns derived from the image to be searched. Bayes target matching-templates and target matched-filters estimation is accomplished by utilizing a statistical estimator capable of extracting statistical information corresponding to the other unknown objects in a search image without recourse to the a priori knowledge normally provided by training samples from the other objects in the scene. These Bayes target matching-templates and target matched-filters, when applied to an input search image, identify and locate the target in the search image with minimum error.

The system and method is adaptive in the sense that both the Bayes target matching-template and the Bayes target matched-filter can be readily re-optimizing (adapting) to provide optimal discrimination between the target and any unknown objects which may exist in a new search image using only unlabeled measurements from the new search image.

The operation of the system can be divided into an off-line training procedure and an on-line image correlation procedure.

Two embodiments of the Adaptive Bayes Image Correlation System are presented.

The first embodiment of the Adaptive Bayes Image Correlation System uses a spatial template-matching method of image correlation. It uses a set of labeled patterns, derived from target templates, and unlabeled patterns derived from the image to be searched, to estimate an optimal Bayes target matched-template. This Bayes target matching-template, when correlated with the input search image, identifies and locates the target in the search image with minimum error.

The second embodiment of the Adaptive Bayes Image Correlation System uses a frequency domain matched-filter method for image correlation which is implemented using the Fast Fourier Transform (FFT). The second embodiment uses a set of labeled patterns, derived from target templates, and unlabeled patterns derived from the image to be searched, to estimate an optimal Bayesian target matched-filter. This matched-filter, when correlated with the input search image, identifies and locates the target in the search image with minimum error.

DRAWINGS—FIGURES

FIG. 1—block diagram for a basic image correlation procedure

FIG. 2—correlation search area and target reference image(s)

FIG. 3—plot illustrating maximum likelihood classification using two class conditional Gaussian probability density functions FIG. 4—plot illustrating the unconditional probability density function, P(X), which is the sum of two Gaussian distributions.

Figure 6:
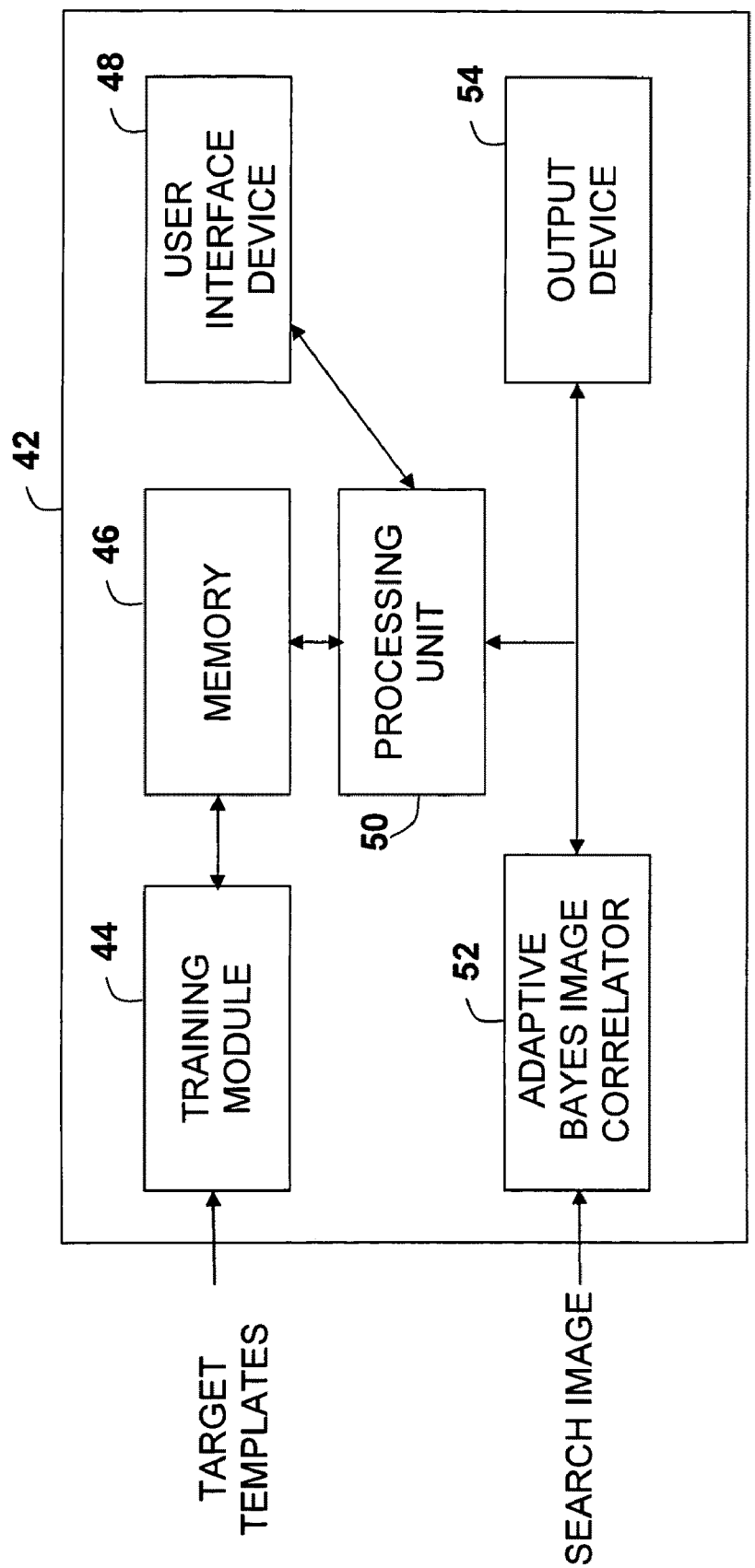

FIG. 5—plot illustrating the Adaptive Bayes Decision Rule using the target conditional posterior probability function FIG. 6—block diagram for the Adaptive Bayes Image Correlation System, including its components, for the preferred embodiment.

Figure 7:
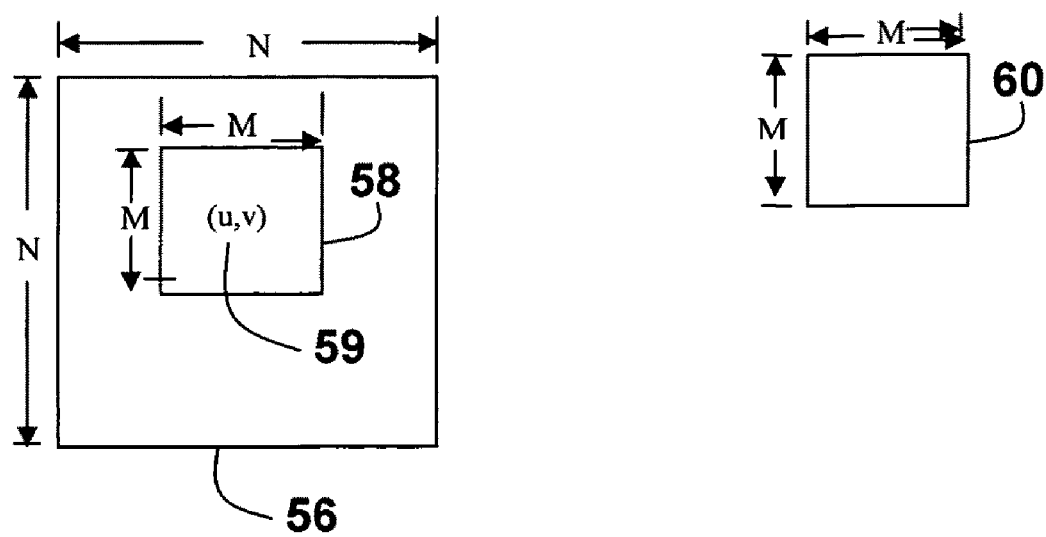
Figure 8:
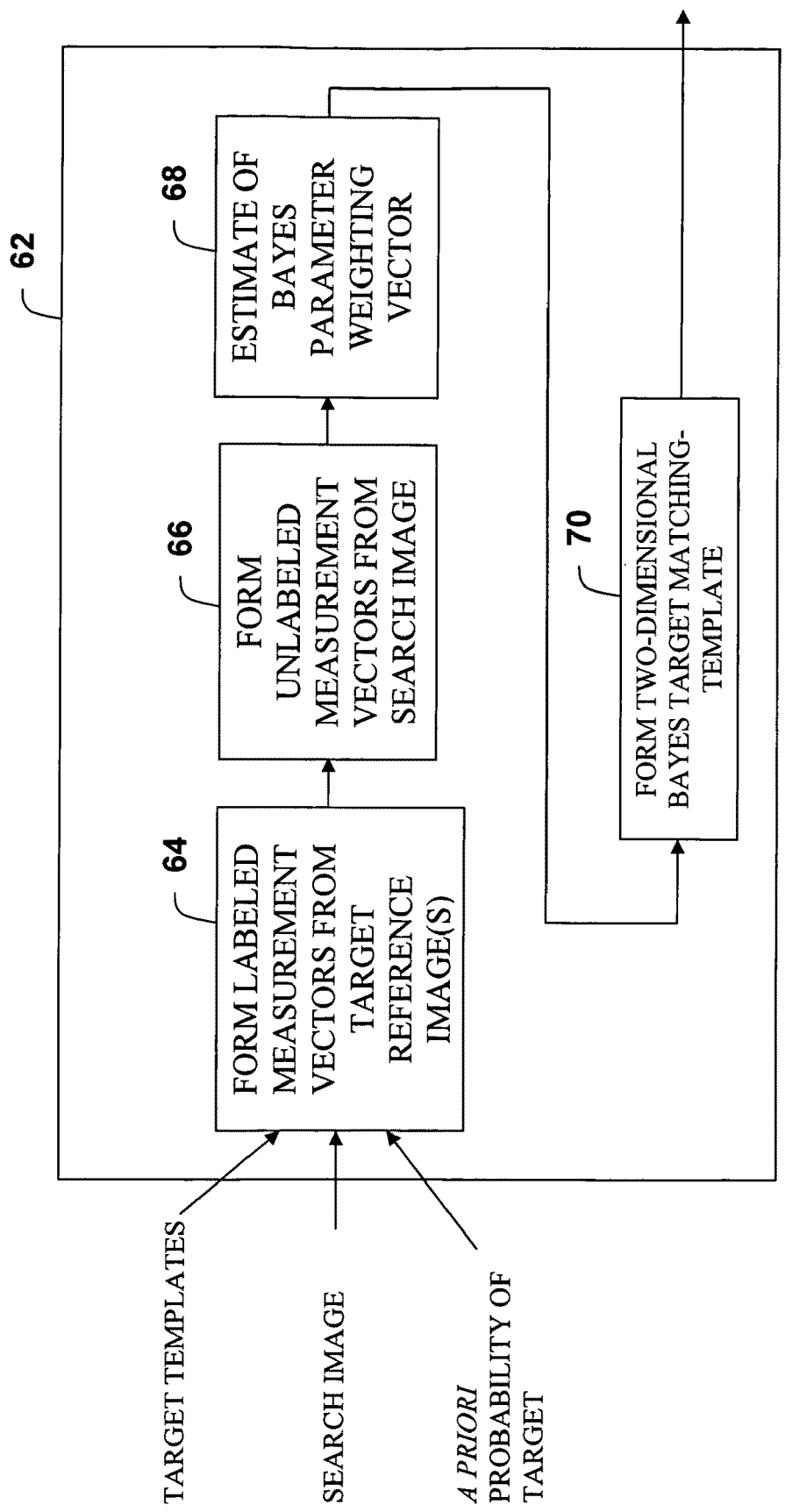
Figure 9:
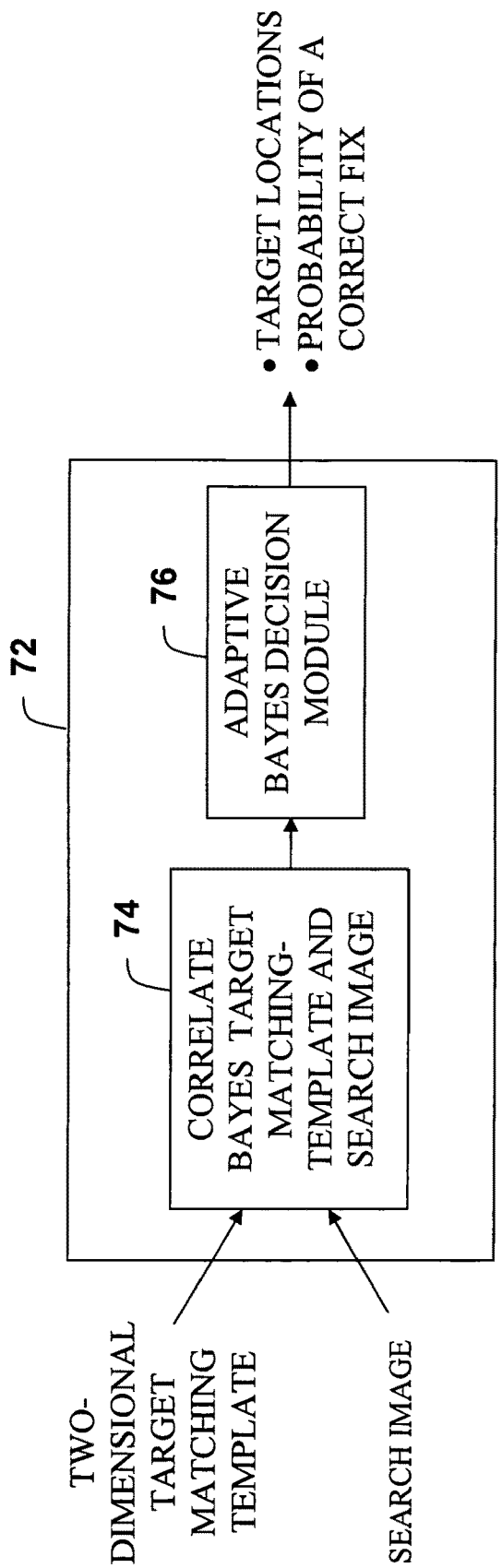
Figure 10:
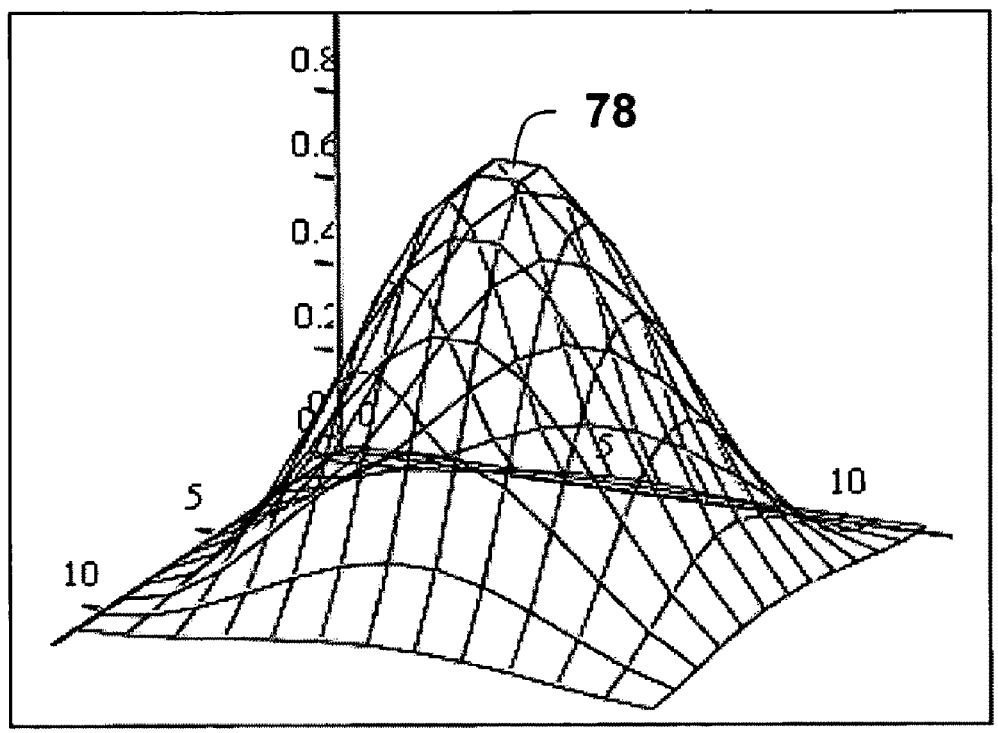
Figure 11:
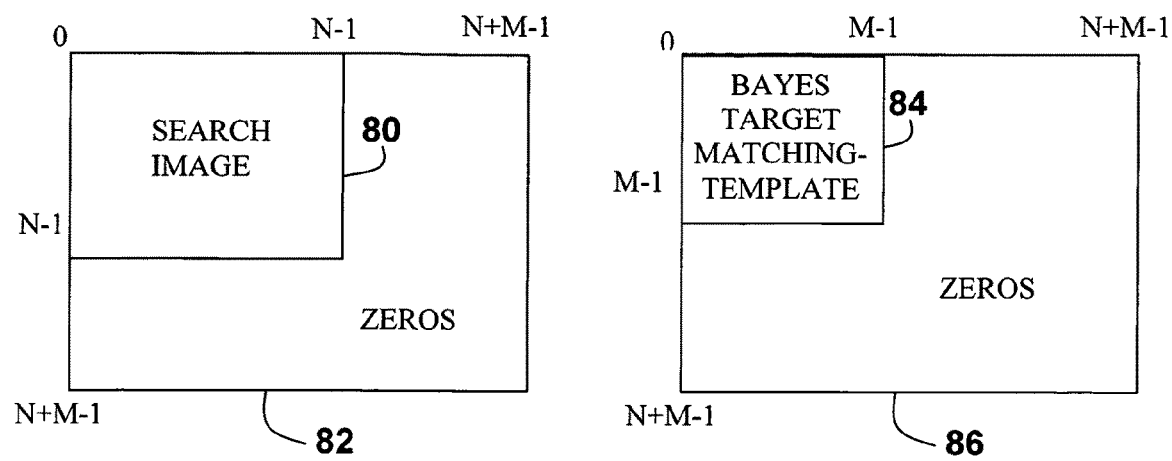
Figure 12:
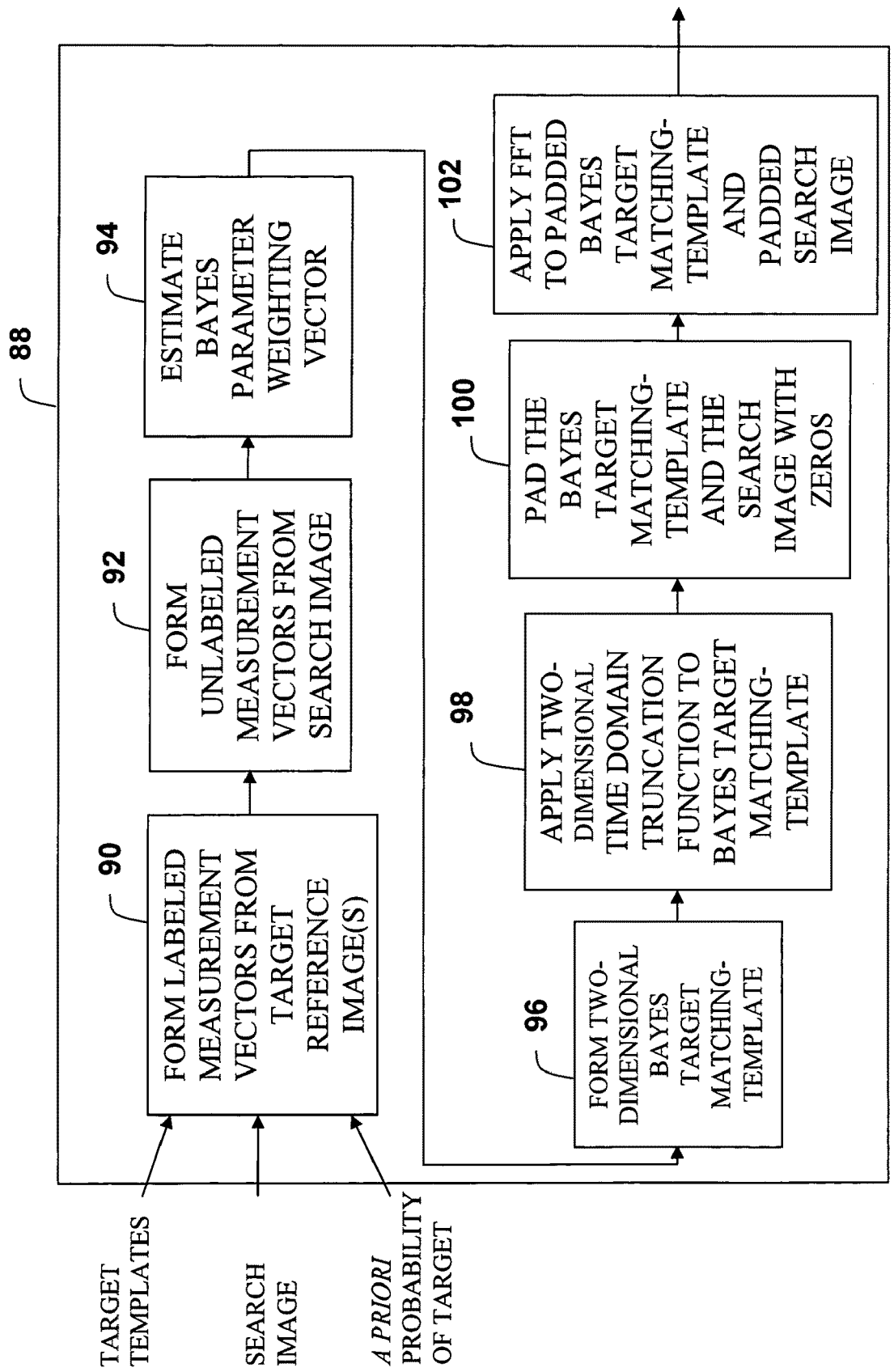
Figure 13:
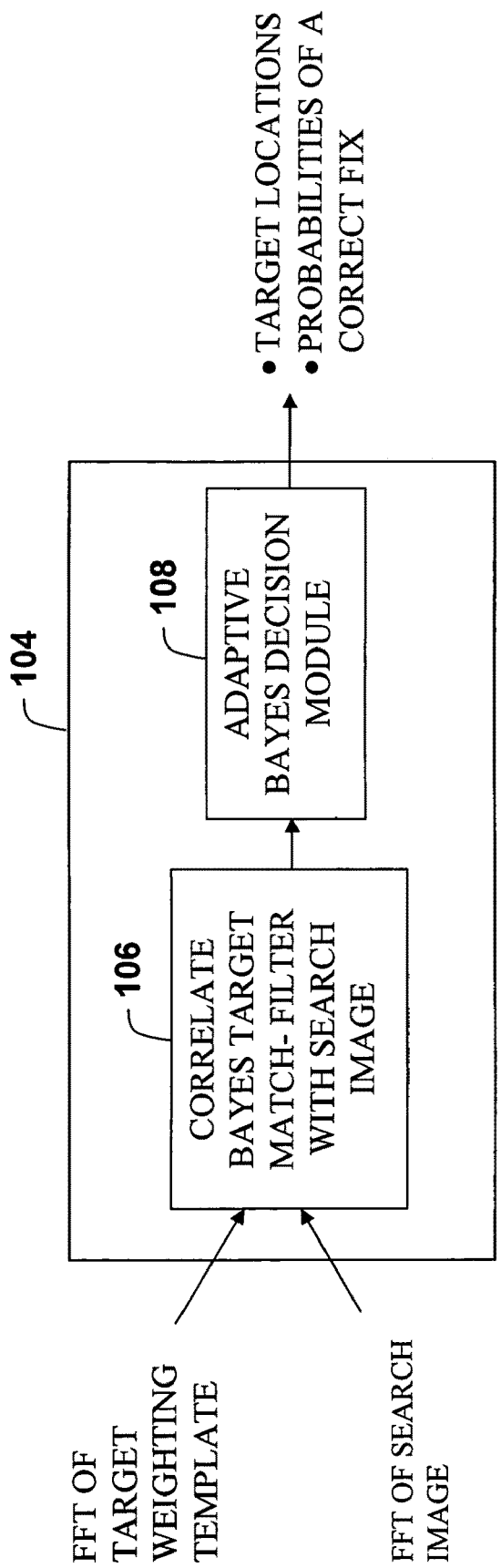

FIG. 7—illustration of the correlation search area and a target matching-template FIG. 8—processing flow diagram for the off-line training module for the first embodiment of the Adaptive Bayes Image Correlation System FIG. 9—processing flow for the on-line Adaptive Bayes Correlation Module for the first embodiment of the Adaptive Bayes Image Correlation System FIG. 10—plot of a two-dimension Hanning (cosine) truncation function FIG. 11—illustration of the padded search image and the padded Bayes target matching-template FIG. 12—processing flow diagram for the off-line training module for the second embodiment of the Adaptive Bayes Image Correlation System FIG. 13—processing flow for the on-line Adaptive Bayes Correlation Module for the second embodiment of the Adaptive Bayes Image Correlation System FIGS. 14A-14D—test object templates and 3-d surface plots of the gray levels for test objects FIGS. 15A-15E—test results from the first performance test of the Adaptive Bayes Image Correlation System FIGS. 16A-16F—test results from the second performance test of the Adaptive Bayes Image Correlation System FIGS. 17A-17F—test results from the third performance test of the Adaptive Bayes Image Correlation System

DRAWINGS—REFERENCE NUMERALS 10 image correlator
12 search image
14 sub-area of search image
15 center of sub-area of search image
16 target reference images $T_1(y,z)$
18 target reference images $T_{K_t}(y,z)$
20 target conditional probability density function
22 decision boundary for two class maximum likelihood classifier
24 not-target conditional probability density function
26 region where samples are classified as "target"
28 region where samples are classified as "not-target"
30 unconditional conditional probability density function for the sum of two conditional probability functions
32 target posterior probability function
34 decision boundary for adaptive Bayes classifier
36 decision threshold for adaptive Bayes classifier
38 region where samples are classified as "target"
40 region where samples are classified as "not-target"
42 processing flow diagram for the preferred embodiment of the Adaptive Bayes Image Correlation system
44 training module
46 memory
48 user interface device
50 processing unit
52 adaptive Bayes image correlator
54 output device
56 search image
58 search image sub-area
59 center of search image sub-area
60 Bayes target matching-template
62 processing flow diagram for the off-line training module for the first embodiment of the Adaptive Bayes Image Correlation System
64 module for forming labeled measurement vectors from target reference image(s)
66 module for forming unlabeled measurement vectors from search image
68 module for estimating the Bayes parameter weighting vector
70 module for forming two-dimensional Bayes target matching-template
72 processing flow diagram for the on-line image correlation processing module for the first embodiment of the Adaptive Bayes Image Correlation System
74 module for correlating the Bayes target matching-template with the search image
76 adaptive Bayes decision module
78 plot of a two-dimension Hanning (cosine) truncation function
80 search image
82 search image padded with zeros
84 Bayes target matching-template
86 Bayes target matching-template padded with zeros
88 processing flow diagram for the off-line training module for the second embodiment of the Adaptive Bayes Image Correlation System
90 module for forming labeled measurement vectors from target reference image(s)
92 module for forming unlabeled measurement vectors from search image
94 module for estimating the Bayes parameter weighting vector
96 module for forming two-dimensional Bayes target matching-template
98 module for applying two-dimensional time domain truncation function to Bayes target matching-template
100 module for padding the Bayes target matching-template and the search image with zeros
102 module for applying FFT to padded Bayes target matching-template and padded search image
104 processing flow diagram for the on-line adaptive image correlation processing module for the second embodiment of the Adaptive Bayes Image Correlation System
106 module for frequency domain image correlation of the Bayes target matched-filter with the search image
108 adaptive Bayes decision module
110 grey rendition of the target, a Gaussian object
112 image correlation results for first embodiment using a Bayes target matching-template
114 image correlation results for second embodiment using a frequency domain Bayes target matched-filter
116 3-D grey scale rendition of the target, a Gaussian shaped object
118 3-D grey scale rendition of the unknown object, a square shaped object
120 image correlation results for first embodiment using a Bayes target matching-template
122 image correlation results for second embodiment using a frequency domain Bayes target matched-filter
124 image correlation results for target using standard method of template matching
126 image correlation results for unknown object using standard method of template matching
128 3-D grey rendition of the target, a square shaped object
130 3-D grey scale rendition of the unknown object, a Gaussian shaped object
132 image correlation results for first embodiment using a Bayes matched-template
134 image correlation results for second embodiment using a frequency domain Bayes target matched-filter
136 image correlation results for target using standard method of template matching
138 image correlation results for unknown object using standard method of template matching Detailed Description—First Embodiment—FIGS. 6 and 7

The first embodiment of the Adaptive Bayes Image Correlation System uses a template-matching method to correlate images.

The template-matching method of cross-correlation is normally considered computationally intensive and not suitable for real-time applications. This is true when the search image and the target template are similar in size. However it is important to note that the dimensions of the target template T(y,z) are usually of much smaller than the dimensions of the search image S(y,z). Moik [Moik, J. G.; Digital Processing of Remotely Sensed Images, NASA SP-431, National Aeronautics and Space Administration, 1980, pp. 66] showed that when the dimensions of the target template are much smaller than the dimensions of the search image, the template-matching method requires fewer computations than frequency domain methods using the Fast Fourier Transform (FFT). For example, a trade-off performed by Moik showed that if the search image is 256×256 pixels in size and the target template is 13×13 pixels (or less) in size, template-matching image correlation is computationally more efficient than FFT's for image correlation.

Referencing FIG. 6, the first embodiment of the Adaptive Bayes Image Correlation system 42 is defined to consist of an Adaptive Bayes Image Correlator 52, a Training Module 44, a Processing Unit 50, Memory 46, a User Interface Device 48, and an Output Device 54. The Adaptive Bayes Image Correlation system operates to process measurements from an input Search Image into two classes, target and not-target, for purposes of 1) identifying the presences of targets in an input Search Image, 2) estimating the probability of a correct fix, and 3) estimating the location of the target(s) in the Search Image. The first embodiment of the Adaptive Bayes Image Correlation system can be used in a number of applications, such as medical image registration, GIS, content-based image retrieval, face recognition, fingerprint recognition, and registration of multi-spectral images acquired from earth-observing satellites.

A mathematical description for the overall operation of the first embodiment of the Adaptive Bayes Image Correlation system will be described first.

In the literature [R. O. Duda and P. E. Hart, *Pattern Classification and Scene Analysis*, New York: John Wiley & Sons, 1973, pp.279] the standard approach for spatial template-matching is to compute a measure, C(y,z), that measures the similarity between a target template, T(y−u,z−v), and the search image, S(y,z), using the following expression;

$$C(u, v) = P_{C_t} \sum_{y=1}^{N} \sum_{z=1}^{N} S(y, z) T(y - u, z - v) \quad (49)$$

for y,z such that (y−u,z−v) is in D
where we sum over all y and z in the domain, D, of the translated template. Equation (49) computes a nearest neighbor metric for target identification.

As described below, the first embodiment uses a modification of the standard approach, for searching an image for the target. Specifically, the target template, T(y−u,z−v), in eq. (49) is replaced with a Bayes target matching-template, W(y,z), which is constructed from the Bayes parameter weighting vector $A=(a_1,a_2,\ldots a_d)^T$, as described below.

Constructing the Bayes Target Matching-Template W(y,z) from the Bayes Parameter Weighting Vector $A=(a_1,a_2,\ldots a_d)^T$ The Bayes target matching-template, W(y,z), is constructed by converting the Bayes parameter weighting vector, $A=(a_1,a_2,\ldots a_d)^T$, into a M×M template, where $A=(a_1, a_2,\ldots a_d)^T$ is estimated as follows $$A = P_{C_t} \left\{ \frac{1}{K} \sum_{i=1}^{K} [X(i)X(i)^T] \right\}^{-1} \cdot \frac{1}{K_t} \sum_{j=1}^{K_t} [X_t(j)] \quad (50)$$

where the labeled target samples $X_t(j)$, j=1, 2, ..., K, are derived from the target templates and the unlabeled samples X(i), i=1, 2, ..., K are derived from the search image. The dimension of the Bayes parameter weighting vector $A=(a_1, a_2,\ldots a_d)^T$ is d=M².

Construction of W(y,z) is accomplished by filling in the two-dimensional template, W(y,z), column-wise. The first column of W(y,z) is constructed from the first M elements of the A vector. The next column is constructed from the next M elements of the A vector, and so forth, for all M columns of W(y,z). The size of W(y,z) is M×M.

Adaptive Bayes Image Correlation using Spatial Template-Matching

Referencing FIG. 7, correlation between the Bayes target matching-template, W(y,z) 60, and the search image is performed by systematically scanning the Bayes target matching-template across the search image S(y,z) 56. A correlation measure, C(y,z), is computed between the Bayes target matching-template, W(y,z), and each sub-area S(y−u,z−v) 58 of the search image S(y,z) 56. The center of sub-area S(y−u, z−v) 58 is located at (u,v) 59. Scanning of the search image is accomplished by incrementing (u,v) over all permissible values of y and z.

The adaptive Bayes spatial template-matching correlator is defined as:

$$C(u, v) = \sum_{y=1}^{N} \sum_{z=1}^{N} S(y, z) W(y - u, z - v) \quad (51)$$

for y,z such that (y−u,z−v) is in D
where we sum over all y and z in the domain, D, of the translated matching-template.

It was previously noted, in eq. (45), that the target posterior probability function $P(C_t/X)$ can be approximated using:

$$\hat{P}(C_t/X) \cong A^T X \quad (52)$$

The correlation measure C(y,z), computed in eq. (51), is equivalent to the estimator for $\hat{P}(C_t/X)$ in eq. (52) above, where W(y,z) has replaced $A=(a_1,a_2,\ldots a_d)^T$ and S(y−u,z−v) has replaced the measurement vector X in eq. (51) above. Therefore the value of C(y,z) at location (y,z) in the search image is an estimate of the probability of a correct fix at location (y,z), or $$\hat{P}(C_t/X)_{(y,z)} \cong C(y,z) \quad (53)$$

The value of C(y,z) will vary between zero (probability of a correct fix=0) and one (probability of a correct fix=1). Substituting eq. (53) into eq. (10), the Bayes decision rule for locating a target is If: $C(y,z) \geq \frac{1}{2}$ (54)

A target is located at location (y,z)
Otherwise, a not-target is located at location (y,z)
The outputs from the first embodiment of the Adaptive Bayes Image Correlation system are target locations in the search image and the probabilities of a correct fix at the target locations.

Operation—First Embodiment—FIGS. 2, 8, and 9

The Off-Line Method

Step 1—Constructing Labeled Target Measurement Vectors from the Target Templates Referencing FIG. 8, the off-line method 62 for the first embodiment begins with step 64, where labeled target measurement vectors are created from input two-dimensional target template(s). This is accomplished as follows:

As shown in FIG. 2, target reference images $T_1(y,z)$ 16 thru $T_{K_t}(y,z)$ 18, contain templates of the target, which are M×M in size. It is assumed, for the sake of generality, there are $K_t$ reference images, $T_j(y,z)$, j=1, 2, . . . , $K_t$, available, each containing an example of the target. A target measurement vector $X_t(j)$ is constructed from $T_j(y,z)$ by stacking the M columns of $T_j(y,z)$. The first M elements of the target measurement vector $X_t(j)$ are the elements of the first column of $T_j(y,z)$, the next M elements are from the second column, and so forth, for all M columns of $T_j(y,z)$. The dimension, d, of $X_t(j)$ is $d=M^2$. This procedure produces $K_t$ measurement vectors, $X_t(j)$, j=1, 2, . . . , $K_t$, one for each target template.

Step 2—Constructing Unlabeled Measurement Vectors from the Search Image

Again referencing FIG. 8, the off-line method 62 continues with step 66, where unlabeled measurement vectors are created from the search image as follows: As shown in FIG. 2, the image to be searched, S(y,z) 12, is considered for simplicity, to be N×N pixels in size where N>M. We select a M×M dimension sub-area S(y−u,z−v) 14 which is equal to the target template in size. As shown in FIG. 2, the center of sub-area S(y−u,z−v) is located at (u,v) 15. An unlabeled measurement vector, X(i), is constructed from the M×M sub-area S(y−u,z−v) 14 by stacking the columns of the M×M sub-area. The dimensional, d, of the unlabeled measurement vector, X(i), is $d=M^2$. The search image is systematically scanned by incrementing u and v, over the permissible arrange of y and z. The index i for X(i) is indexed to u and v. From the search image, K unlabeled measurement vectors, X(i), i=1, 2, . . . , K are constructed where $K=(N-M+1)^2$.

Step 3—Estimating the Bayes Parameter Weighting Vector, $A=(a_1,a_2, \ldots a_d)^T$ Again referencing FIG. 8, the off-line method 62 continues with step 68, where the Bayes parameter weighting vector $A=(a_1,a_2, \ldots a_d)^T$ is estimated using the following expression:

$$A = P_{C_t}\left\{\frac{1}{K}\sum_{i=1}^{K}[X(i)X(i)^T]\right\}^{-1} \cdot \frac{1}{K_t}\sum_{j=1}^{K_t}[X_t(j)] \quad (55)$$

where the labeled target samples $X_t(j)$, j=1, 2, . . . , $K_t$ are derived from the target templates in step 64 and the unlabeled samples X(i), i=1, 2, . . . , K are derived from the search image in step 66. The Bayes parameter weighting vector $A=(a_1, a_2, \ldots a_d)^T$ has dimension, $d=M^2$.

Step 4—Construct Two-Dimensional Bayes Target Matching-Template, W(y,z)

Again referencing FIG. 8, the off-line method 62 continues with step 70 where a two-dimensional Bayes target matching-template W(y,z) is constructed from the Bayes parameter matching-vector $A=(a_1,a_2, \ldots a_d)^T$ by filling in the template, W(y,z), column-wise. The first column of W(y,z) is constructed from the first M elements of the vector $A=(a_1,a_2, \ldots a_d)^T$. The next column is constructed from the next M elements of the vector $A=(a_1,a_2, \ldots a_d)^T$, and so forth, for all M columns of W(y,z). The size of W(y,z) is M×M.

The On-Line Method

Step 1—Correlate the Bayes Target Matching-Template and the Search Image

Referencing FIG. 9, the on-line method 72 for the first embodiment begins with step 74 where correlation is performed between the Bayes target matching-template, W(y,z), and the search image. FIG. 7 shows a depiction of the Bayes target matching-template W(y,z) 60, and the search image S(y,z) 56. Again referencing FIG. 7, correlation between the Bayes target matching-template, W(y,z) 60, and the search image sub-area S(y,z) 56 is performed by systematically scanning the Bayes target matching-template across the search image S(y,z) 56.

Again referencing FIG. 7, a correlation measure, C(y,z), is computed between the Bayes target matching-template, W(y,z), and each sub-area S(y−u,z−v) 58 of the search image S(y,z) 60 using the following expression:

$$\text{If: } C(y,z) \geq \frac{1}{2} \quad (56)$$

A target is located at location (y,z)

Otherwise, a not-target is located at location (y,z)

where we sum over all y and z in the domain, D, of the translated Bayes target matching-template.

The value of C(y,z) at location (y,z) is an estimate of the probability of a correct fix at location (y,z) in the search image or $$P(C_t/X)_{(y,z)} \cong C(y,z) \quad (57)$$

The value of C(y,z) will vary between zero (probability of a correct fix=0) and one (probability of a correct fix=1).

Step 2—Adaptive Bayes Decision Module

Again referencing FIG. 9, the on-line method 72 for the first embodiment continues with step 76 where the results from the correlation process in step 74 are evaluated to identify the presences of the target in the search image using the Bayes decision rule. The adaptive Bayes decision criteria for locating a target is:

$$\text{If: } C(y,z) \geq \frac{1}{2} \quad (58)$$

A target is located at location (y,z)

Otherwise, a not-target is located at location (y,z)

The outputs from the first embodiment of the Adaptive Bayes Image Correlation procedure are target locations in the search image and probabilities of a correct fix, C(y,z), at the target locations.

Detailed Description—Second Embodiment—FIGS. 6, 10, and 11

The second embodiment of the Adaptive Bayes Image Correlation System uses a matched-filter approach to image correlation, implemented using the Fast Fourier Transform (FFT).

Frequency domain image correlation is a computationally efficient technique for image cross-correlation. Analysis performed by Moik [Moik, J. G.; Digital Processing of Remotely Sensed Images, NASA SP-431, National Aeronautics and Space Administration, 1980, pp. 66] showed that when the target template and the search image are similar in size, the number of computations required to perform image cross-correlation using FFT's is almost independent of the size of the images being cross-correlated. Another important property of Fourier transforms is that convolution of two functions in the spatial domain is equivalent to multiplication in spatial frequency domain.

Referencing FIG. 6, the second embodiment of the Adaptive Bayes Image Correlation system 42 is defined to consist of an Adaptive Bayes Image Correlator 52, a Training Module 44, a Processing Unit 50, Memory 46, a User Interface Device 48, and an Output Device 54. The Adaptive Bayes Image Correlation system operates to process measurements from an input Search Image into two classes, target and not-target, for purposes of 1) identifying the presences of targets in an input Search Image, 2) estimating the probability of a correct fix, and 3) estimating the location of the target(s) in the Search Image. The second embodiment of the Adaptive Bayes Image Correlation system is particularly well suited for real-time applications such as guiding a missile to a pre-selected target, medical image registration, GIS, and content-based image retrieval, face recognition, fingerprint recognition and registration of multi-spectral images, acquired from earth-observing satellites.

A mathematical description for the overall operation of the second embodiment of the Adaptive Bayes Image Correlation system will be described first.

In the literature [R. O. Duda and P. E. Hart, *Pattern Classification and Scene Analysis*, New York: John Wiley & Sons, 1973, pp. 307] the standard formula for spatial frequency domain cross-correlation of a target reference image $T(y,z)$ and search image $S(y,z)$ using a matched-filter, is as follows:

$$C(y,z) = \mathfrak{J}^{-1}\{T(f_y,f_z)^* S(f_y,f_z)\} \quad (59)$$

where $C(y,z)$ is a measure of the cross-correlation between the target template and the search image, and where $T(f_y,f_z)$ and $S(f_y,f_z)$ are the Fourier transforms of the target reference image $T(y,z)$ and the search image $S(y,z)$, or $$T(f_y,f_z) = \mathfrak{J}\{T(y,z)\} \quad (60)$$

$$S(f_y,f_z) = \mathfrak{J}\{S(y,z)\} \quad (61)$$

The Fourier transform operation and its inverse are defined, respectively, $\mathfrak{J}$ and $\mathfrak{J}^{-1}$ and $T(f_y,f_z)^*$ is the complex conjugate of $T(f_y,f_z)$. The function, $T(f_y,f_z)$, is referred to as the target matched-filter.

Notice that the results of the cross-correlation operation prescribed in eq. (59), gives the value of the cross-correlation everywhere. In other words, frequency domain cross-correlation exploits the convolution theorem to calculate the value of the cross-correlation for all translations of the template in a single operation.

For adaptive Bayes image correlation using matched-filtering, we will simply substitute the Fourier transform of a Bayes target matching-template, $W(f_y,f_z)$, for the target template $T(f_y,f_z)$ in equ. (59).

The Bayes target matching-template, $W(y,z)$, is constructed from the Bayes parameter weighting vector, $A=(a_1, a_2, \ldots a_d)^T$ which is estimated as follows:

$$A = P_{C_t}\left\{\frac{1}{K}\sum_{i=1}^{K}[X(i)X(i)^T]\right\}^{-1} \cdot \frac{1}{K_t}\sum_{j=1}^{K_t}[X_t(j)] \quad (62)$$

where the labeled target samples $X_t(j)$, $j=1, 2, \ldots, K_t$ are derived from the target templates and the unlabeled samples $X(i)$, $i=1, 2, \ldots, K$ are derived from the search image. The Bayes parameter weighting vector $A=(a_1,a_2, \ldots a_d)^T$ has dimension $d=M^2$.

Construction of the $W(y,z)$ is accomplished by filling in the two-dimensional Bayes target matching-template, $W(y,z)$, column-wise. The first column of $W(y,z)$ is constructed from the first $M$ elements of the $A$ vector. The next column is constructed from the next $M$ elements of the weighting vector $A=(a_1,a_2, \ldots a_d)^T$, and so forth, for all $M$ columns of $W(y,z)$. The size of $W(y,z)$ is $M \times M$.

To reduce leakage when $W(y,z)$ is transformed into the frequency domain, a two-dimensional time domain truncation function [Brigham, E. O., The Fast Fourier Transform and Its Applications, Prentice Hall, 1988, pp. 181-182] is applied to the Bayes target matching-template, $W(y,z)$. A popular choice for a time domain truncation function is the Hanning (cosine) function. A two-dimensional Hanning truncation function, $H(y,z)$, can be generated for a $M \times M$ image using the following expression:

$$H(y, z) = \frac{1}{4}\left(1 - \cos\left(2\pi \cdot \frac{y}{M}\right)\right)\left(1 - \cos\left(2\pi \cdot \frac{z}{M}\right)\right), \text{ if } 0 < y < M, \quad (63)$$

$$0 < z < M$$

$$H(y, z) = 0, \text{ otherwise}$$

FIG. 10 shows an example of a two-dimensional Hanning truncation function 78 generated using eq. (63).

Given a two-dimensional truncation function, such as the Hanning window $H(y,z)$, generated using eq. (63), and a Bayes target matching-template, $W(y,z)$, a truncated Bayes target matching-template, $W_T(y,z)$, is generated by multiplying corresponding elements the matrices $H(y,z)$ and $W(y,z)$, or $$w_T(i,j) = h(i,j) \cdot w(i,j), \text{ for all } 0 < i < M, 0 < j < M \quad (64)$$

To prevent edge effects or circular correlation [Brigham, E. O., The Fast Fourier Transform and Its Applications, Prentice Hall, 1988, pp. 262], the truncated Bayes target matching-template, $W_T(y,z)$, and the search image, $S(y,z)$, are padded with zeros. FIG. 11 depicts a truncated Bayes target matching-template $W_T(y,z)$ 84, and a padded Bayes matching-template $W_{T_p}(y,z)$ 86. Also depicted in FIG. 11 is a Search Image, $S(y,z)$ 80, and a padded search image, $S_p(y,z)$ 82.

The Fast Fourier Transform (FFT) is then applied to padded images, $W_{T_p}(y,z)$, and $S_p(y,z)$, or $$W_{T_p}(f_y,f_z) = \mathfrak{J}\{W_{T_p}(y,z)\} \quad (65)$$

$$S_p(f_y,f_z) = \mathfrak{J}\{S_p(y,z)\} \quad (66)$$

The function, $W_{T_p}(f_y,f_z)$, is the Bayes target matched-filter—obtained by taking the FFT of the Bayes target matching-template.

Next, the Bayes target matching-filter, $W_{T_p}(f_y,f_z)$, and the search image $S_p(f_y,f_z)$ are cross-correlated using the following expression:

$$C(y,z) = \mathfrak{J}^{-1}\{W_{T_p}(f_y,f_z)^* S_p(f_y,f_z)\} \quad (67)$$

It was previously noted, in eq. (45), that the target posterior probability function $P(C_t/X)$ can be approximated using $\hat{P}(C_t/X) \cong A^T X$.

The correlation measure $C(y,z)$, computed in eq. (67), is equivalent to the estimator for target posterior probability $\hat{P}(C_t/X)$ where $W_{T_p}(f_y,f_z)$ has replaced $A=(a_1,a_2, \ldots a_d)^T$ and $S_p(f_y,f_z)$ has replaced the measurement vector $X$ in $\hat{P}(C_t/X) \cong A^T X$. Therefore the value of $C(y,z)$ at location $(y,z)$ in the search image is an estimate of the probability of a correct fix at location $(y,z)$, or $$\hat{P}(C_t/X)_{(y,z)} \cong C(y,z) \quad (68)$$

The value of $C(y,z)$ will vary between zero (probability of a correct fix=0) and one (probability of a correct fix=1).

Substituting eq. (68) into eq. (10), the adaptive Bayes decision rule for locating a target in the search image is:

If: $C(y,z) \geq \frac{1}{2}$ \quad (69)

A target is located at location (y,z)

Otherwise, a not-target is located at location (y,z)

The outputs from the second embodiment of the Adaptive Bayes Image Correlation procedure are target locations in the search image and probabilities of a correct fix at the target locations.

Operation—Second Embodiment—FIGS. 2, 12, 13, 14, 15, 16, and 17

The Off-Line Method

Step 1—Constructing Labeled Target Measurement Vectors from Target Templates

Referencing FIG. 12, the off-line method 88 for the second embodiment begins with step 90, where labeled target measurement vectors are created from input two-dimensional target template(s) as follows: As shown in FIG. 2, target reference images, $T_1(y,z)$ 16 thru $T_{K_t}(y,z)$ 18, contain examples of the target, which are M×M pixels in size. It is assumed, for the sake of generality, that $K_t$ reference images, $T_j(y,z)$, j=1, 2, . . . , $K_t$, are available, each containing an example of the target. A target measurement vector, $X_t(j)$, is constructed from $T_j(y,z)$ by stacking the M columns of $T_j(y,z)$. The first M elements of the target measurement vector $X_t(j)$ are the elements of the first column of $T_j(y,z)$, the next M elements are from the second column, and so forth, for all M columns of $T_j(y,z)$. The dimension, d, of $X_t(j)$ is d=$M^2$. This procedure produces $K_t$ labeled measurement vectors, $X_t(j)$, j=1, 2, . . . , $K_t$, one for each target template.

Step 2—Constructing Unlabeled Measurement Vectors from the Search Image

With reference to FIG. 12, the off-line method 88 for the second embodiment continues with step 92, where unlabeled measurement vectors are created from the search image as follows: As shown in FIG. 2, the image to be searched, S(y,z) 12, is considered for simplicity, to be N×N in size where N>M. We select a M×M dimension sub-area S(y−u,z−v) 14 which is equal to the target template in size. As shown in FIG. 2, the center of sub-area S(y−u,z−v) is located at (u,v) 15. An unlabeled measurement vector, X(i), is constructed from the M×M sub-area S(y−u,z−v) 14 by stacking the columns of the M×M sub-area. The dimensional, d, of the unlabeled measurement vector, X(i), is d=$M^2$. The search image is systematically scanned by incrementing u and v over a permissible range of y and z. The index i for X(i) is indexed to u and v. From the search image, K unlabeled measurement vectors, X(i), i=1, 2, . . . , K are constructed where K=$(N-M+1)^2$.

Step 3—Estimating the Bayes Parameter Weighting Vector, A=$(a_1, a_2, \ldots a_d)^T$ With reference to FIG. 12, the off-line method 88 of the second embodiment continues with step 94, where the Bayes parameter weighting vector A=$(a_1, a_2, \ldots a_d)^T$ is estimated. The Bayes parameter weighting vector, A=$(a_1, a_2, \ldots a_d)^T$, is estimated as follows.

$$A = P_{C_t} \left\{ \frac{1}{K} \sum_{i=1}^{K} [X(i)X(i)^T] \right\}^{-1} \cdot \frac{1}{K_t} \sum_{j=1}^{K_t} [X_t(j)] \tag{70}$$

where the labeled target samples $X_t(j)$, j=1, 2, . . . , $K_t$ are derived from the target templates in step 90 and the unlabeled samples X(i), i=1, 2, . . . , K are derived from the search image in step 92. The Bayes parameter weighting vector, A=$(a_1, a_2, \ldots a_d)^T$, has dimension, d=$M^2$.

Step 4—Construct Two-Dimensional Bayes Target Matching-Template, W(y,z)

With reference to FIG. 12, the off-line method 88 of the second embodiment continues with step 96, where a two-dimensional Bayes target matching-template, W(y,z), is constructed from the Bayes parameter weighting vector, A=$(a_1, a_2, \ldots a_d)^T$, by filling in the template, W(y,z), column-wise. The first column of W(y,z) is constructed from the first M elements of the A=$(a_1, a_2, \ldots a_d)^T$ vector. The next column is constructed from the next M elements of the A==$(a_1, a_2, \ldots a_d)^T$ vector, and so forth, for all M columns of W(y,z). The size of W(y,z) is M×M.

Step 5—Apply Two-Dimensional Time Domain Truncation Function to Bayes Target Weighting Template With reference to FIG. 12, the off-line method 88 for the second embodiment continues with step 98, where a two-dimensional truncation function, such as the Hanning truncation function, is generated and applied to the two-dimensional Bayes target matching-template W(y,z). The Hanning truncation function, H(y,z), is generated using the following expression:

$$H(y, z) = \frac{1}{4}\left(1 - \cos\left(2\pi \cdot \frac{y}{M}\right)\right)\left(1 - \cos\left(2\pi \cdot \frac{z}{M}\right)\right), \text{ if } 0 < x < M, \tag{71}$$
$$0 < y < M$$
$$H(y, z) = 0, \text{ otherwise}$$

A truncate Bayes target matching-template, $W_T(y,z)$, is constructed by multiplying corresponding elements the matrices H(y,z) and W(y,z), or $$w_T(i,j) = h(i,j) \cdot w(i,j), \text{ for all } 0 < i < M, 0 < j < M \tag{72}$$

Step 6—Padding the Bayes Target Weighting Template and the Search Image

With reference to FIG. 12, the off-line method 88 for the second embodiment continues with step 100, where the truncated Bayes target matching-template, $W_T(y,z)$, and the search image, S(y,z), are padded with zeros to prevent edge effects or circular correlation. The outputs from this padding process are $W_{TP}(y,z)$ and $S_P(y,z)$.

Step 7—Apply FFT to the Padded Bayes Target Weighting Template and the Padded Search Image With reference to FIG. 12, the off-line method 88 for the second embodiment continues with step 102, where the FFT is applied to the padded and truncated Bayes target matching-template, $W_{TP}(y,z)$, and the padded search image, $S_p(y,z)$, or $$W_{TP}(f_y, f_z) = \Im\{W_{TP}(y,z)\} \tag{73}$$

$$S_P(f_y, f_z) = \Im\{S_P(y,z)\} \tag{74}$$

The function $W_{TP}(f_y, f_z)$ is the Bayes target matched-filter—obtained by taking the FFT of the Bayes target matching-template in eq. (73).

The On-Line Method

Step 1—Correlate the Bayes Target Matched-Filter and the Search Image

Referencing FIG. 13, the on-line method 104 for the second embodiment begins with step 106 where correlation is performed between the Bayes target matched-filter and the search image. The inputs to this step are the Bayes target matched-filter, $W_{TP}(f_y, f_z)$, and the FFT of the search image, $S_P(f_y, f_z)$. The Bayes target matched-filter $W_{TP}(f_y, f_z)$ and the search image $S_P(f_y,f_z)$ are cross-correlated using the following expression:

$$C(y,z) = \mathfrak{z}^{-1}\{W_{TP}(f_y,f_z)^* S_P(f_y,f_z)\} \tag{75}$$

The value of $C(y,z)$ is an estimate of the probability of a correct fix at location $(y,z)$ in the search image, or $$P(C_t/X)_{(y,z)} \cong C(y,z) \tag{76}$$

Step 2—Adaptive Bayes Decision Module

Again referencing FIG. 13, the on-line method 104 for the second embodiment continues with step 108 where the results from the correlation process in step 106 are evaluated to identify the presences of the target in the search image using the Bayes decision rule, or $$\text{If: } C(y,z) \geq \tfrac{1}{2} \tag{77}$$

A target is located at location $(y,z)$

Otherwise, a not-target is located at location $(y,z)$

The outputs from the second embodiment of the Adaptive Bayes Image Correlation procedure are target locations in the search image and the probabilities of a correct fix at those target locations.

Performance Evaluation of the Two Embodiments of the Adaptive Bayes Image Correlation System The performance of the two embodiments of the Adaptive Bayes Image Correlation System is illustrated below using three examples. The first test example demonstrates the performance of the two embodiments of Adaptive Bayes Image Correlation System (i.e., the spatial matching-template correlator and the frequency domain matched-filter image correlator) in finding the target in a search image which contains only the target.

The second and third examples, demonstrate the ability of the two embodiments of Adaptive Bayes Image Correlation System in locating a target in a search image which contains both the target and an unknown object.

Figure 14A:
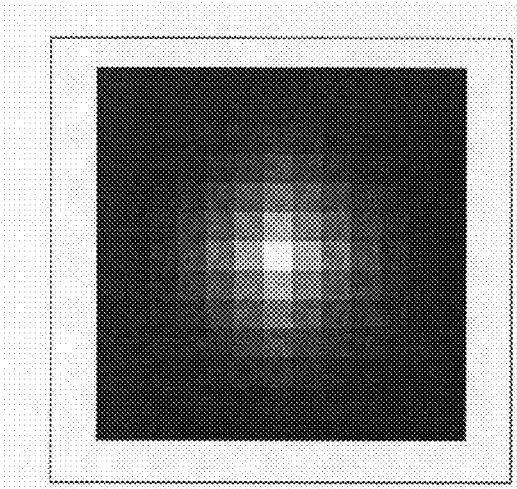
Figure 14C:
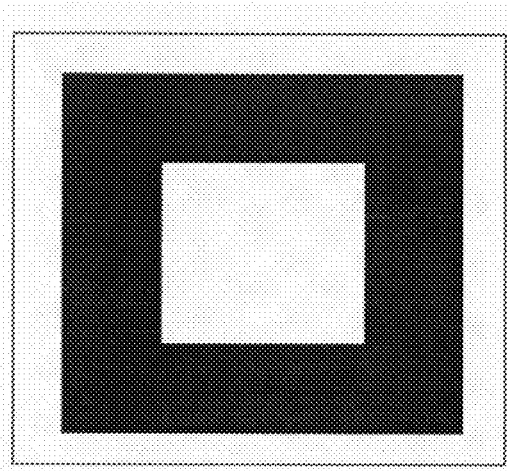
Figure 14B:
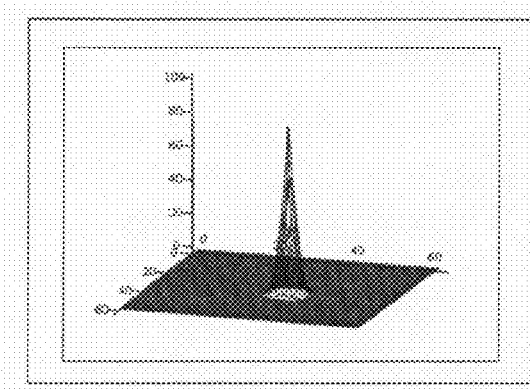
Figure 14D:
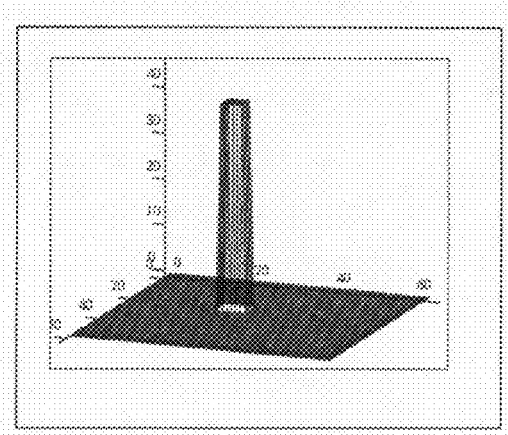

Two objects are used in these tests. The first object, shown in FIG. 14A, is a grey level image rendition of a two-dimension Gaussian function. FIG. 14B shows a three-dimensional surface plots of the grey levels of the Gaussian object. The second object, shown in FIG. 14C is a grey scale image of a square shaped object. FIG. 14D is three-dimensional surface plots of the grey levels of the square object.

First Test Case—The Search Image Contains Only the Target

The purpose of the first test case is to demonstrate the performance of the two embodiments of the Adaptive Bayes Image Correlation system in the ideal situation where the search image contains only the target.

FIG. 15 shows the correlation test results for the first test case.

Figure 15A:
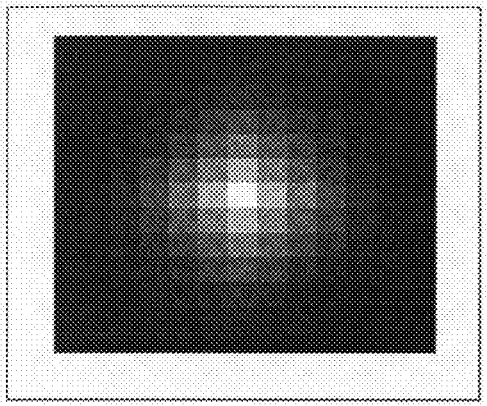
Figure 15B:
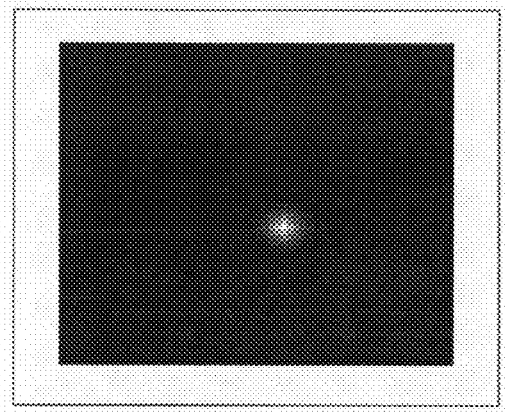
Figure 15C:
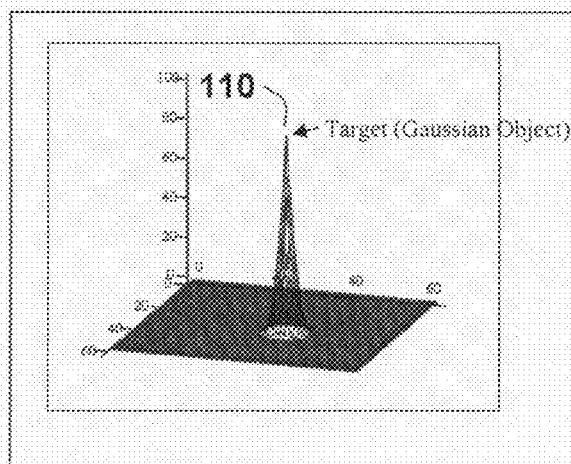

The template for the target being searched for (the Gaussian object) is shown in FIG. 15A. The search image is shown in FIG. 15B. FIG. 15C shows a three-dimensional surface plot of the grey levels 110 of the search image containing the target (a Gaussian object).

Figure 15D:
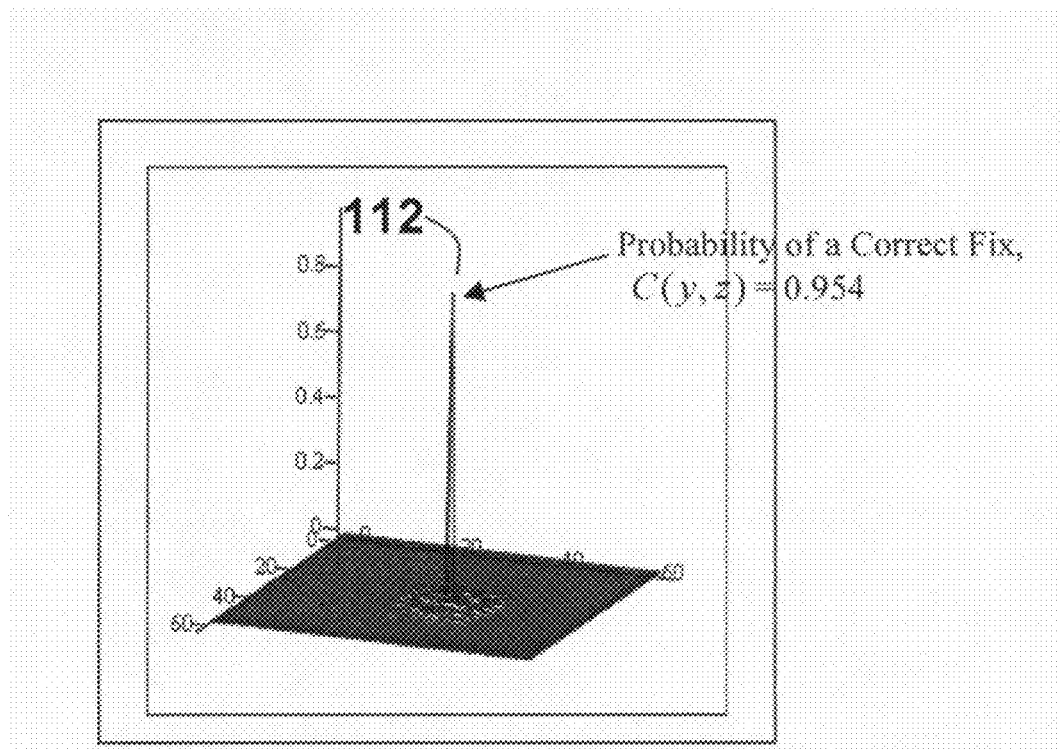

FIG. 15D shows the correlation results 112 generated using the first embodiment of the Adaptive Bayes Image Correlation system, (the Bayes matching-template image correlator). Comparing the target location 110 in the search image, shown in FIG. 15C, with the target location 112 shown in correlation results in FIG. 15D, it can be seen in FIG. 15D that correlation peaks at the correct target location and the probability of a correct fix, $C(y,z)$, at that location is 0.954 (or 95.4%).

Figure 15E:
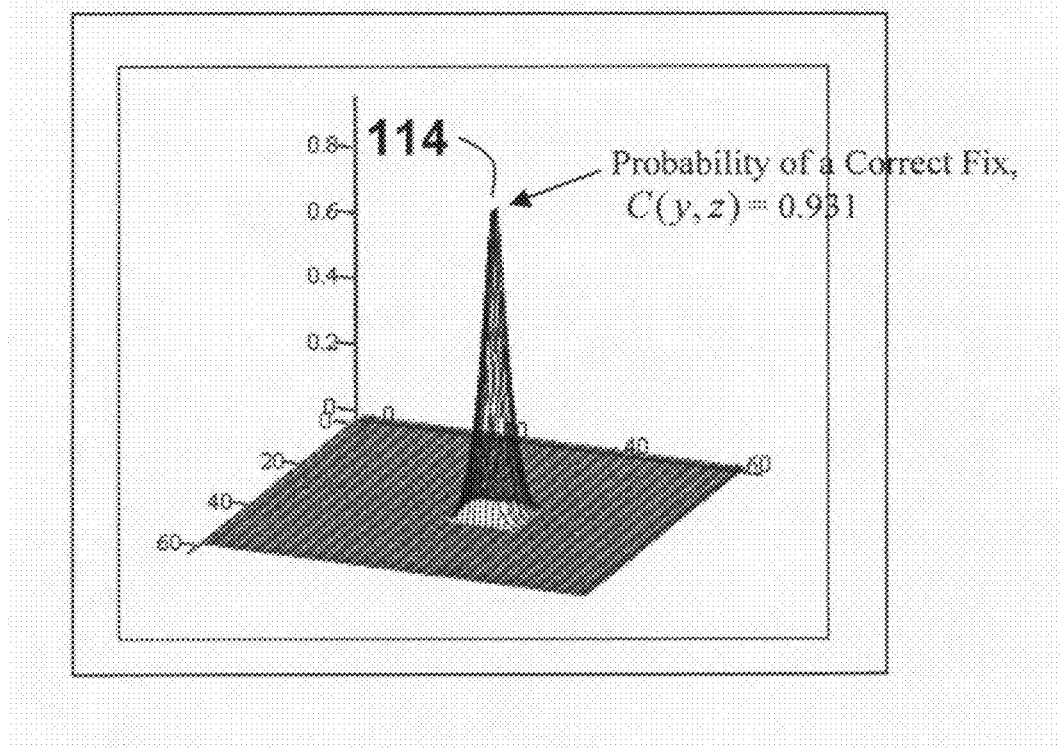

FIG. 15E shows the correlation results generated using the second embodiment of the Adaptive Bayes Image Correlation system (the frequency domain matched-filter image correlator).

Comparing the target location 110 in the search image, shown in FIG. 15C, with the target location 114 shown in correlation results in FIG. 15E, it can be seen in FIG. 15E that correlation peaks at the correct target location and the probability of a correct fix at that location is 0.931 (or 93.1%).

Thus both embodiments of the Adaptive Bayes Image Correlation System were successful in locating the target in the search image and the probabilities of a correct fix at those locations were very high.

Comparing the sharpness of the correlation peaks in FIG. 15D and FIG. 15E, it can be seen that correlation peak 112 for the first embodiment is much sharper than the correlation peak 114 for the second embodiment and thus the first embodiment provides a more precise target location estimate.

Second Test Case—Search Image Contains Both a Target (a Gaussian Object) and an Unknown Object (a Square Object)

The purpose of the second test is to demonstrate the performance of the two embodiments of the Adaptive Bayes Correlation System in the locating a target (a Gaussian object) in a search image which also contains an unknown object (a square object). In addition, for comparison, test results are presented which demonstrate the results achievable using the standard spatial template matching image correlator, as defined in eq. (49).

FIG. 16 shows correlation test results for the second test case.

Figure 16A:
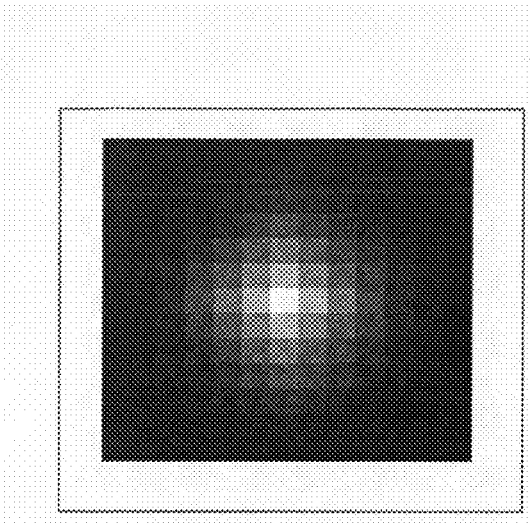
Figure 16B:
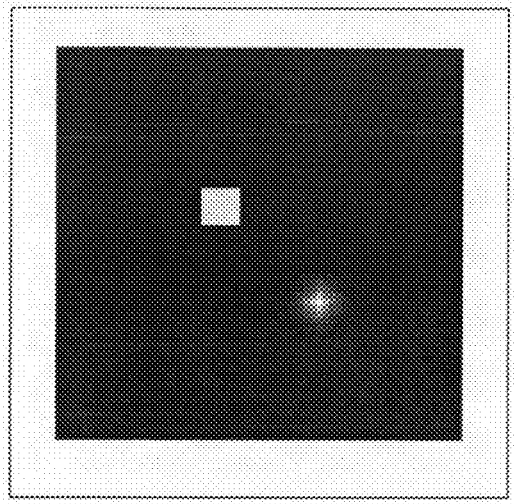

The target template (a Gaussian object) is shown in FIG. 16A. The search image, shown in FIG. 16B, contains both a target (a Gaussian object) and an unknown object (a square object).

Figure 16C:
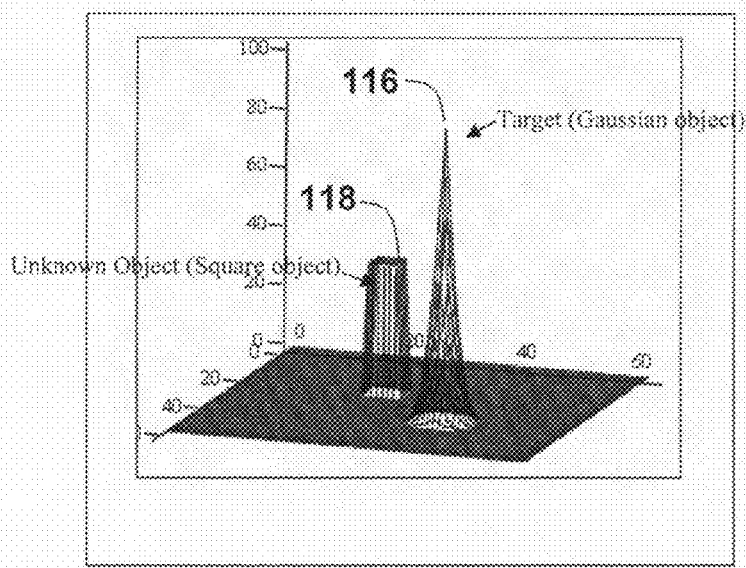

Shown in FIG. 16C is a three-dimensional surface plot of the grey levels of the search image containing the target 116 (a Gaussian object) and the unknown object 118 (a square object).

Figure 16D:
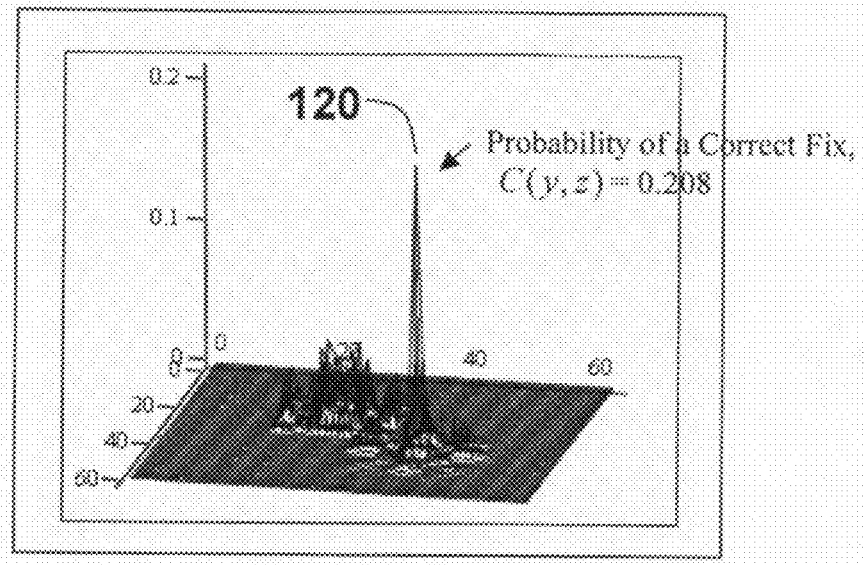

FIG. 16D shows the correlation results generated using the first embodiment of Adaptive Bayes Image Correlation System (the template matching method). Comparing the target location 116 in the search image, shown in FIG. 16C, with the target location 120 shown in correlation results in FIG. 16D, it can be seen in FIG. 16D that correlation peaks at the correct target location and the probability of a correct fix, $C(y,z)$, at that location is 0.208 (or 20.8%).

Figure 16E:
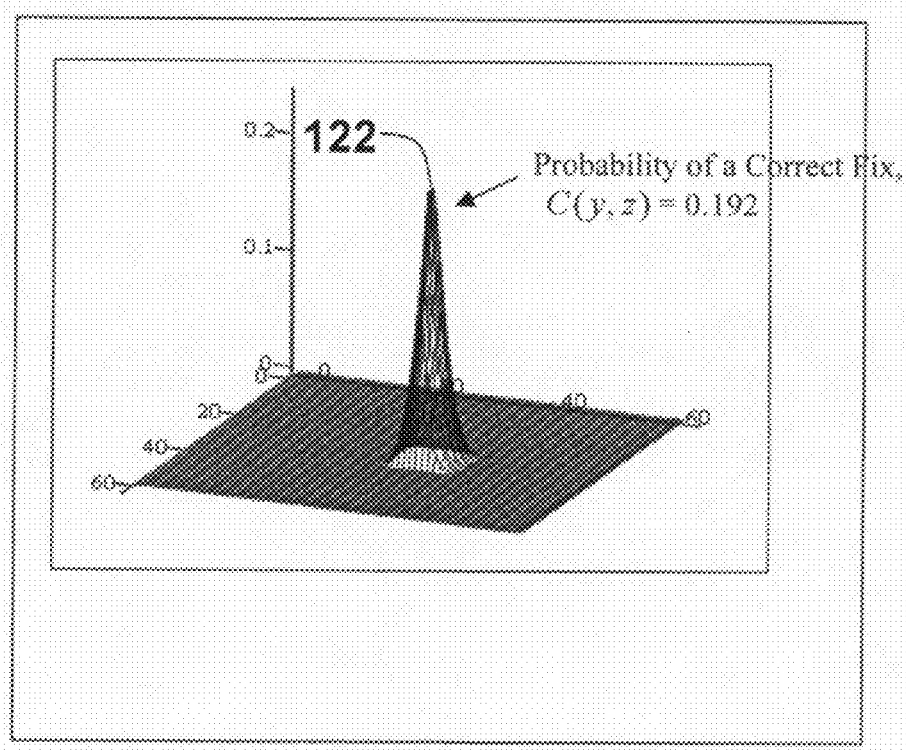

FIG. 16E shows the correlation results generated by the second embodiment of the Adaptive Bayes Image Correlation system (the frequency domain matched-filter method). Comparing the target location 116 in the search image, shown in FIG. 16C, with the target location 122 shown in correlation results in FIG. 16E, it can be seen in FIG. 16E that correlation peaks at the correct target location and the probability of a correct fix, $C(y,z)$, at that location is 0.192 (or 19.2%).

Thus in the second test, both embodiments of the Adaptive Bayes Correlation system were successful in locating the target. However, the probabilities of a correct fix at these locations were low—less than 0.5 (or 50%). Low confidence indicates that the target and the unknown object were very similar and as a result both embodiments of the Adaptive Bayes Correlation system had difficulty in discriminating between the target (the Gaussian object) and the unknown object (the Square object). A procedure for improving the confidence of these location fixes is described below.

Comparing the sharpness of the correlation peaks in FIG. 16D and FIG. 16E, it can be seen that, again, the first embodiment of Adaptive Bayes Image Correlation System (the spatial template match method) provides the sharpest peak 120 and therefore the most precise estimate target location. However, the sidelobes for the first embodiment are much higher than those of the second embodiment of Adaptive Bayes Image Correlation System. The second embodiment of Adaptive Bayes Image Correlation System had little or no sidelobes and therefore its peak-to-sidelobe ratio is expected to be very high.

Figure 16F:
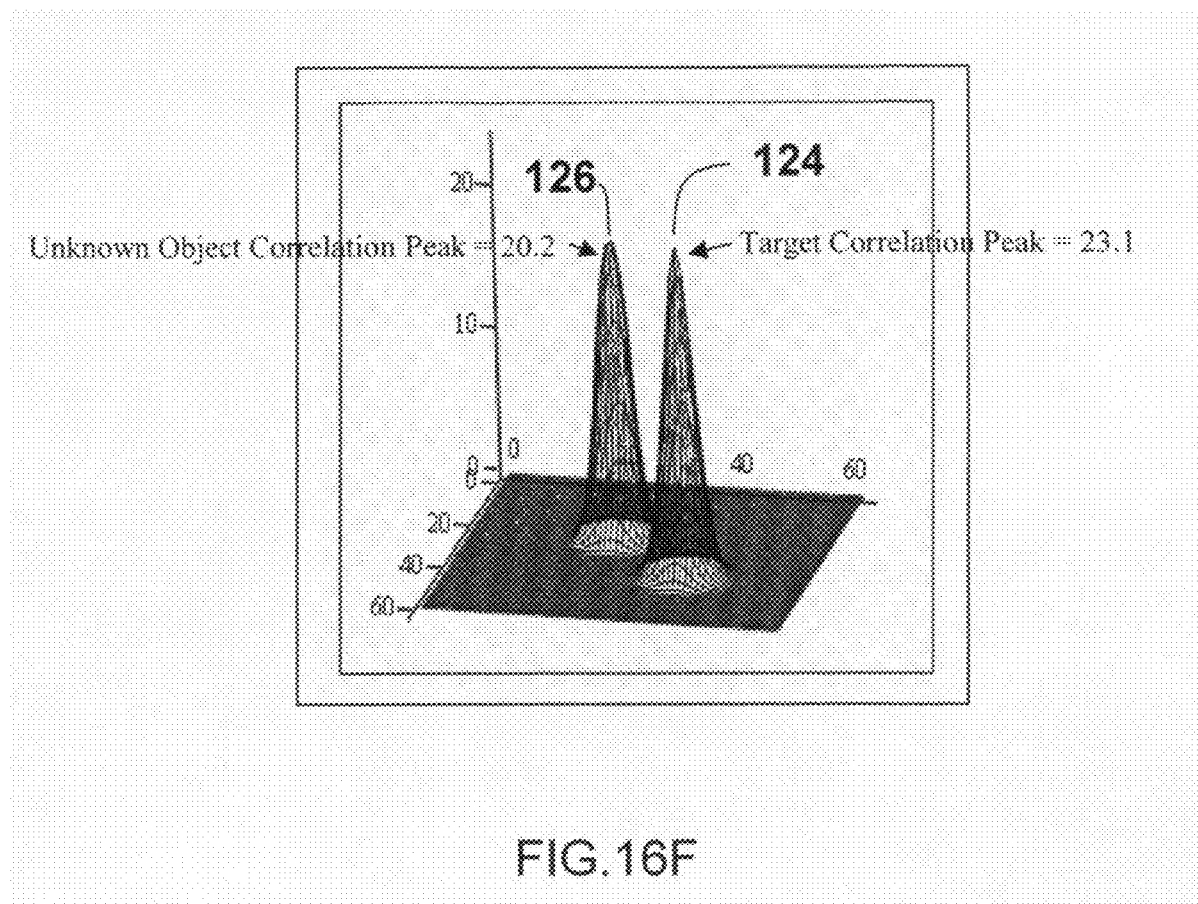

For comparison purposes, FIG. 16F shows test results for the standard spatial template matching image correlator, as defined in eq. (49). As shown in FIG. 16F, the target 124 (the Gaussian object) has a correlation peak of 23.1 and the unknown object 126 (the Square Object) has a correlation peak of 20.2. Thus the standard correlator correctly identified the target, since the target has the higher correlation peak. However, the correlation peaks are very similar in amplitude which implies a low confidence target location fix. In addition, the amplitude of the correlation peaks is not a predictor of the probability of a correct fix.

Third Test Case—Search Image Contains Both the Target (a Square Object) and an Unknown Object (a Gaussian Object)

The purpose of the third test is to demonstrate the performance of the two embodiments of the Adaptive Bayes Correlation System in the locating the target (a Square object) in a search image which also contains an unknown object (a Gaussian object). The third test case is the reverse of the second test case, where the target object and the unknown object are switched. In addition, for comparison, results are presented which demonstrate the results achievable using the standard spatial template matching image correlator, defined in eq. (49).

FIG. 17 shows correlation test results for the third test case.

Figures 17A, 17B:
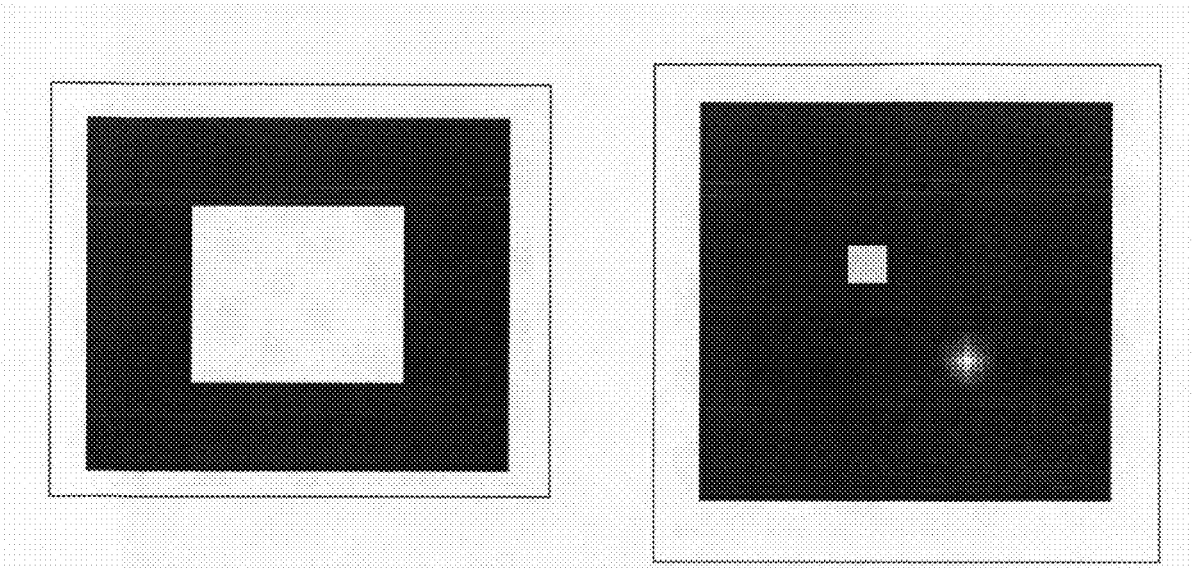

The target template (a Gaussian object) is shown in FIG. 17A. The search image, shown in FIG. 17B, contains both a target (the Square object) and an unknown object (the Gaussian object).

Figure 17C:
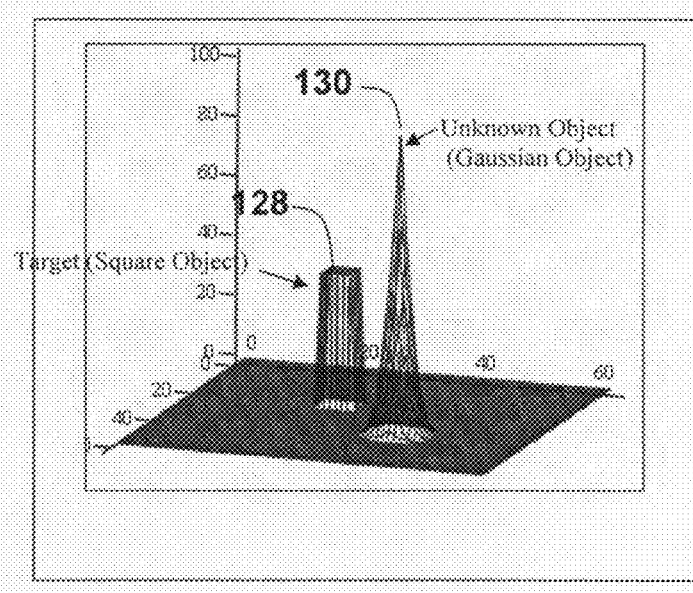

Shown in FIG. 17C is a three-dimensional surface plot of the grey levels of the search image containing the target 128 (a square object) and the unknown object 130 (a Gaussian object).

Figure 17D:
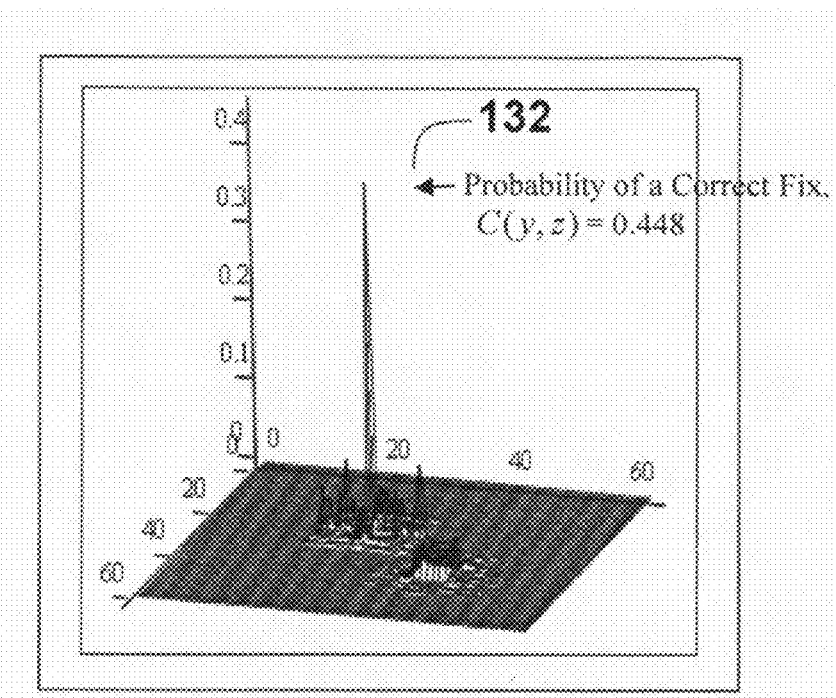

FIG. 17D shows the correlation results generated using the first embodiment of Adaptive Bayes Image Correlation System (the spatial template matching method of image correlation). Comparing the target location 128 in the Search Image in FIG. 17C, with the first embodiment correlation results 132 in FIG. 17D, it can be seen that correlation peaks at the target location and the probability of a correct fix , $C(y,z)$, at that location is 0.448 (or 44.8%).

Figure 17E:
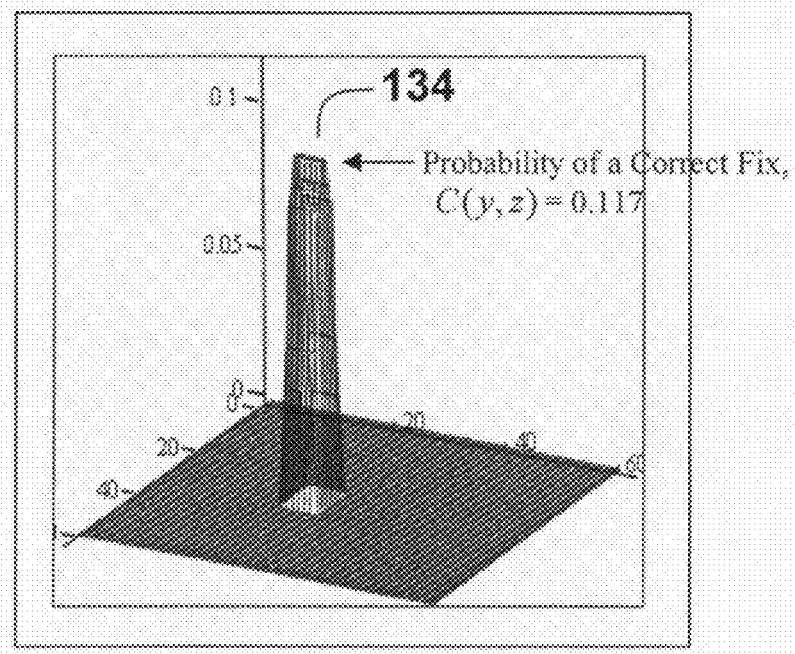

FIG. 17E shows the correlation results generated by the second embodiment of the Adaptive Bayes Image Correlation System (the frequency domain matched-filter method of image correlation). Comparing the target location 128 in the Search Image in FIG. 17C, with the correlation results 134 from the second embodiment in FIG. 17E, it can be seen that correlation peaks at the target location and the probability of a correct fix, $C(y,z)$, at that location is 0.117 (or 11.7%).

Thus in the third test, both adaptive Bayes image correlators were successful in locating the target. However, the probabilities of a correct fix at these locations were low, less than 0.5 (or 50%). Low confidence indicates that the target and the unknown object were very similar and as a result both embodiments of the Adaptive Bayes Correlation system had difficulty in discriminating between the target (the Square object) and the unknown object (the Gaussian object). A procedure for improving the confidence of these location fixes is described below.

Comparing the sharpness of the correlation peaks in FIG. 17D and FIG. 17E, it can be seen that, again, the first embodiment of Adaptive Bayes Image Correlation System (the spatial template match method) provided the sharpest peak and therefore the most precise estimate target location. However, the sidelobes for the first embodiment are higher than those of the second embodiment of Adaptive Bayes Image Correlation System. The second embodiment of Adaptive Bayes Image Correlation System had little or no sidelobes.

Figure 17F:
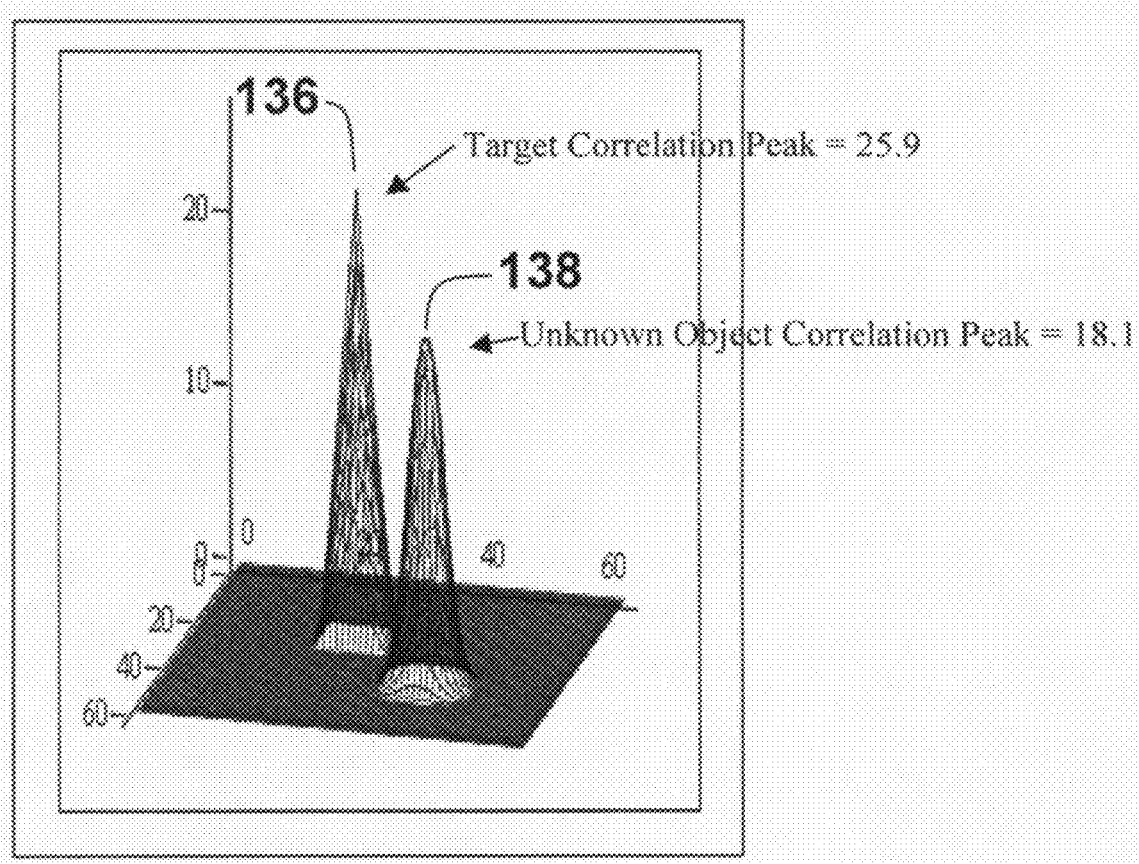

For comparison purposes, FIG. 17F shows test results for the standard spatial template matching image correlator, as defined in eq. (49). As shown in FIG. 17F, the target 136 (the Square object) has a correlation peak of 25.9 and the unknown object 138 (the Gaussian Object) has a correlation peak of 18.1. Thus the standard correlator correctly identified the target, since the target has the higher correlation peak. However, the correlation peaks are very similar in amplitude which implies low confidence the target location fix. In addition, the amplitude of the correlation peaks is not a predictor of the probability of a correct fix.

Procedure for Improving Confidence in the Location Fix

The second and third test cases, shown in FIG. 16 and FIG. 17, provided two examples of accurate target location fixes but with low probabilities of a correct fix. For a valid location fix the probability of a correct fix, $C(y,z)$, should be greater than 0.5, or $C(y,z) \geq \frac{1}{2}$. These low confidences were the result of difficulty in discriminating between the two objects in the search image (the Gaussian shaped object and the Square object).

To address the problem of low probabilities of a correct fix, we will assume that two objects cannot occupy the same space at the same time—a reasonable assumption. The approach then for improving the confidence in target identification, is to extract the pixels surrounding a potential target location (identified by a sharp correlation peak but with a low probabilities of a correct fix) and construct a new search image containing only those extracted pixels. A second target search is then performed on the new search image containing only those pixels with appropriate padding. If the object in the new search image is truly the target, the probability of a correct fix should be greater than 0.5, i.e., $C(y,z) \geq \frac{1}{2}$.

The validity of this approach can be confirmed by examining the results from the test cases one and two. In Test Case Two, shown in FIG. 16D and FIG. 16E, it was seen the potential target location had sharply defined correlation peaks, 120 and 122, but low probabilities of a correct fix, $C(y,z) < \frac{1}{2}$. However, the First Test Case demonstrated that if the search image truly contains only the target, the probability of a correct fix, $C(y,z)$, will be close to 1.0. This can be seen by examining by the heights of the correlation peaks 112 and 114 in FIG. 15D and FIG. 15E, were both are close to 1.0. If the new search image does not contain the target, the probability of a correct fix, $C(y,z)$ will be less than 0.5, or $C(y,z) < \frac{1}{2}$.

CONCLUSION, RAMIFICATIONS, AND SCOPE

Accordingly the reader will see that the Adaptive Bayes Image Correlation system can be used in many real world applications for correlating two images for the purpose of identifying a target in an image where templates are provided a priori only for the target. Information on the other objects in the image being searched may be unavailable or difficult to obtain. This invention treats the problem of designing target matching-templates and target matched-filters for image correlation as a statistical pattern recognition problem. By minimizing a suitable criterion, a target matching-template or a target matched-filter is estimated which approximates the optimal Bayes discriminant function in a least-squares sense. When applied to an image, both the optimal Bayesian target matching-template and the optimal Bayesian target matched-filter are capable of identifying the target in a search image with minimum probability of error while requiring no a priori knowledge of other unknown objects that may exist in the image being searched.

Accurate identification of the presences of a reference image in another image and accurate and unambiguous measurement of its location is important in many practical applications. Image correlation is used in a number of military applications, such as guiding a missile to pre-selected targets, in medical image registration, robotics, automated manufacturing, GIS, and content-based image retrieval. Registration of multi-spectral images, acquired from earth-observing satellites, is another important application.

Military applications often involve recognition of high valued mobile military targets such as tanks in imagery data collected in real time. Often no prior knowledge is available of the other objects in the image which might be confused with a tank, such as decoys (anything that mimics a target but is not a real target), background clutter, man-made structures, and civilian vehicles.

Since 9/11, another important image correlation application is Home Land Security/Law Enforcement with particular interest in areas such as fingerprint recognition, face recognition, iris recognition, and the screening/monitoring of people in public places for persons on watch lists.

In each of these applications, one or more templates are available for targets to be identified in an image (pictures of high valued military targets, pictures of persons on a watch-list). The Adaptive Bayes Image Correlation system is capable searching an input image to identify and locate the target in the search image with minimum probability of error and without any a priori knowledge of other unknown object in the image being searched.

The first embodiment of the Adaptive Bayes Image Correlation System uses a spatial matching-template method of image correlation. The first embodiment uses a set of templates, descriptive of the target, and unlabeled patterns, derived from the image to be searched, to estimate an optimal Bayesian target matching-template. This Bayesian matching-template, when scanned across to the input search image, identifies and locates the target in the search image with minimum error, without any a priori knowledge of other unknown object in the image being searched The second embodiment of the Adaptive Bayes Image Correlation System uses a frequency domain matched-filter approach to image correlation, implemented using the Fast Fourier Transform (FFT). The second embodiment uses a set of templates, descriptive of the target, and unlabeled patterns derived from the image to be searched, to estimate an optimal Bayes target matched-filter. This matched-filter, when applied to the input search image, identifies and locates the target in the search image with minimum error, without any a priori knowledge of other unknown object in the image being searched Additional advantages of the Adaptive Bayes Pattern Recognition system are:

The method is capable of identifying the target in a search image with minimum probability of error while requiring no a priori knowledge of other unknown objects that may exist in the image being searched. The method provides classification accuracies equivalent to that provided by fully supervised classifiers where labeled samples are provided for both the target and not-target objects in the image being searched.

The method identifies a target in an image with minimum classification error. It is well known that in supervised classification problems, the classification accuracy provided by the Bayes classifier is the best that can be achieved.

The system and method is adaptive in the sense that it is capable of readily adapting both the Bayes target matching-template and the Bayes target matched-filter to provide optimal discrimination between the target and any unknown objects which may exist in any new search image using only unlabeled measurements from the new search image.

The method is a nonparametric which means no a priori knowledge is required of the probability distributions of the target and the unknown objects in a search image.

The method is computationally efficient. The template-matching method used by the first embodiment is very computationally efficient for application where the size of the target template is much smaller than the search image. The frequency domain method used by the second embodiment is very computationally efficient for real-time image correlation applications where the target template and the search image are similar in size.

While my above description contains many specificities, these should not be construed as limitations on the scope of the invention, but rather as an exemplification of the presently preferred embodiments. The scope of the embodiment should be determined by appended claims and their legal equivalents, rather than by the examples given.

I claim:

1. A method for classifying and locating a target in a digital search image, comprising the steps of:

receiving target reference images descriptive of said target and an estimate of the a priori probability of said target in said digital search image;

forming a plurality of labeled target measurement vectors from said target reference images;

receiving said digital search image;

forming a plurality of unlabeled measurement vectors from said digital search image;

executing a training stage using said a priori probability of said target in said digital search image, said labeled target measurement vectors, and said of unlabeled measurement vectors from said digital search image, including a step of least squares estimation of a Bayes parameter weighting vector;

forming a two dimensional Bayes target matching-template from said Bayes parameter weighting vector;

correlating said two-dimensional Bayes target matching-template with said digital search image using a spatial domain template-matching image correlation method; and executing an adaptive Bayes classifier to identify objects as either said target or as not-target and determining said target location in said digital search image.

2. The method of claim 1 wherein said step of forming a plurality of labeled target measurement vectors from said target reference images includes a step of transforming the contents of each two-dimensional said target reference image into a said labeled target measurement vector.

3. The method of claim 1 wherein said step of forming a plurality of unlabeled measurement vectors from said digital search image includes a step of scanning said digital search image with a two-dimensional window, equal in size to said target reference images, and transforming the contents of each said two-dimensional widow into a said unlabeled measurement vector.

4. The method of claim 1 wherein said step of correlating said two-dimensional Bayes target matching-template with said digital search image using a spatial domain template-matching image correlation method includes a step of computing a correlation measure which is the value of the target posterior probability at a plurality of locations in said digital search image.

5. The method of claim 1 wherein said step of executing an adaptive Bayes classifier to identify objects as either said target or as not-target includes a step of evaluating said value of target posterior probability using the adaptive Bayes decision rule to identify said object as either said target or as said not-target.

6. The method of claim 1 wherein said step of determining said target location in said digital search image includes the step of identifying locations in said digital search image where said value of target posterior probability peaks for said objects identified as a said target using said adaptive Bayes decision rule.

7. A method for classifying and locating a target in a digital search image, comprising the steps of:
   receiving target reference images descriptive of said target and an estimate of the a priori probability of said target in said digital search image;
   forming a plurality of labeled target measurement vectors from said target reference images;
   receiving said digital search image;
   forming a plurality of unlabeled measurement vectors from said digital search image;
   executing a training stage using said a priori probability of said target in said digital search image, said labeled target measurement vectors, and said of unlabeled measurement vectors from said digital search image, including a step of least squares estimation of a Bayes parameter weighting vector;
   forming a two dimensional Bayes target matching-template from said Bayes parameter weighting vector;
   correlating said two-dimensional Bayes target matching-template with said digital search image using a frequency domain matched-filter image correlation method; and
   executing an adaptive Bayes classifier to identify objects as either said target or as not-target and determining said target location in said digital search image.

8. The method of claim 7 wherein said step of forming a plurality of labeled target measurement vectors from said target reference images includes a step of transforming the contents of each two-dimensional said target reference image into a said labeled target measurement vector.

9. The method of claim 7 wherein said step of forming a plurality of unlabeled measurement vectors from said digital search image includes a step of scanning said digital search image with a two-dimensional window, equal in size to said target reference images, and transforming the contents of each said two-dimensional widow into a said unlabeled measurement vector.

10. The method of claim 7 wherein said step of correlating said two-dimensional Bayes target matching-template with said digital search image using a frequency domain matched-filter includes a step of applying a two-dimensional time domain truncation function to said Bayes target weighting-template.

11. The method of claim 7 wherein said step of correlating said two-dimensional Bayes target matching-template with said digital search image using a frequency domain matched-filter filter image correlation method includes a step of padding the truncated said Bayes target weighting-template and said digital search image with zeroes.

12. The method of claim 7 wherein said step of correlating said two-dimensional Bayes target matching-template with said digital search image using a frequency domain matched-filter filter image correlation method includes a step of applying a fast Fourier transform to the padded and truncated said Bayes target weighting-template and the padded said digital search image.

13. The method of claim 1 wherein said step of correlating said two-dimensional Bayes target matching-template with said digital search image using a frequency domain matched-filter filter image correlation method includes a step of computing a correlation measure which is the value of the target posterior probability at a plurality of locations in said digital search image.

14. The method of claim 7 wherein said step of executing an adaptive Bayes classifier to identify objects as either said target or as not-target includes a step of evaluating said value of target posterior probability using the adaptive Bayes decision rule to identify said object as either said target or as said not-target.

15. The method of claim 7 wherein said step of determining said target location in said digital search image includes the step of identifying a location in said digital search image where said value of target posterior probability peaks for said objects identified as a said target using said adaptive Bayes decision rule.

* * * * *